(12) United States Patent
Kuroda

(10) Patent No.: US 7,354,161 B2
(45) Date of Patent: Apr. 8, 2008

(54) PROJECTOR

(75) Inventor: Akitoshi Kuroda, Yamagata-Mura (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 11/262,990

(22) Filed: Nov. 1, 2005

(65) Prior Publication Data

US 2006/0092384 A1    May 4, 2006

(30) Foreign Application Priority Data

Nov. 4, 2004  (JP) ............................ 2004-321210

(51) Int. Cl.
*G03B 21/14*  (2006.01)
*G02B 7/02*  (2006.01)

(52) U.S. Cl. .................. 353/101; 353/69; 353/70; 353/100; 359/823

(58) Field of Classification Search .............. 353/69, 353/70, 100, 101; 359/642, 713, 811, 819, 359/822, 823
See application file for complete search history.

(56) References Cited

U.S. PATENT DOCUMENTS 6,469,839 B2   10/2002  Agata
7,070,284 B2 *  7/2006  Tanaka et al. ............... 353/84

FOREIGN PATENT DOCUMENTS

| | | |
|---|---|---|
| EP | 1 365 282 A2 | 11/2003 |
| JP | A-5-249409 | 9/1993 |
| JP | A-6-331953 | 12/1994 |
| JP | A 10-335234 | 3/1999 |
| JP | A 11-307436 | 2/2000 |
| JP | A 2000-171899 | 10/2000 |
| JP | A-2001-318425 | 11/2001 |
| JP | A 2003-315916 | 11/2003 |
| JP | A-2004-20866 | 1/2004 |
| JP | A-2004-245956 | 9/2004 |
| JP | A 2005-62852 | 3/2005 |
| JP | A 2005-62853 | 3/2005 |

* cited by examiner

Primary Examiner—Rochelle Blackman
(74) Attorney, Agent, or Firm—Oliff & Berridge, PLC

(57) ABSTRACT

A projection position adjuster (8) of a projector includes a fixing plate (81), a first moving plate (82) that can move in a Y-axis direction and an X-axis direction orthogonal to each other in a plane orthogonal to a projection direction, a first adjusting driver (86) that moves the first moving plate (82) in the Y-axis direction, a second moving plate (83) that can move in the X-axis direction and moves the first moving plate (82) in the X-axis direction by engaging with the first moving plate (82), and a second adjusting driver (87) that moves the second moving plate (83) in the X-axis direction. The first moving plate (82) and the second moving plate (83) are superposed onto the fixing plate (81) in a projection direction. The first moving plate (82) is movably abutted on the fixing plate (81) and supports and fixes the projection lens (3).

7 Claims, 12 Drawing Sheets

PROJECTOR

BACKGROUND OF THE INVENTION

1. Technical Field

The present invention relates to a projector.

2. Related Art

Conventionally, it has been known that projectors are used for presentations at conferences, academic societies and exhibitions. Each of such projectors modulates and combines a light beam irradiated by a light source in accordance with image information and projects the light beam on a screen by a projection optical device in an enlarged manner.

In the above projector, there may be an occasion of projection direction upward with the projector fixed at a lower level, or that of projection direction downward with the projector fixed at a higher level. Therefore, a projector, which is provided with a projection position adjuster at an optical system such as an optical modulator etc. has been known (for example, the document: JP2003-315916A). The projection position adjuster moves a projection optical device in a direction orthogonal to a light-irradiating direction.

The projection position adjuster described in the document includes a fixing base which is recessed by having supporting pieces bent at the both sides to face to each other, a moving base which is projected by having steps at the both sides for supporting the projection optical device, and a bearing mechanism attached between the supporting pieces and the steps when the fixing base faces the moving base. The moving base is guided by the bearing mechanism and moved vertically against the fixing base, so that the projection optical device is moved vertically.

Recently, there has been desired for a structure able to project not only in vertical direction with the projection position being changed vertically, but also in horizontal direction with the projection position being changed horizontally.

However, while the projection position adjuster described in the document can project in the vertical direction, it cannot project in the horizontal direction. Therefore, convenience of the projector can not be enhanced.

SUMMARY

An advantage of some aspects of the invention is to provide a projector that can adjust a projection position of a projection optical device in two axial directions orthogonal to each other in a plane orthogonal to a projection direction, and enhance its convenience.

A projector according to an aspect of the invention includes: an optical modulator that forms an optical image by modulating a light beam irradiated by a light source in accordance with image information; a projection optical device that projects the optical image formed by the optical modulator in an enlarged manner; and a projection position adjuster that moves the projection optical device in a plane orthogonal to a projection direction and adjusts a projection position of the projection optical device, the projection position adjuster including: a fixing plate fixed inside the projector; a first moving plate that can move in a first axial direction and a second axial direction orthogonal to each other in a plane orthogonal to the projection direction; a first adjusting driver that moves the first moving plate in the first axial direction; a second moving plate that can move in the second axial direction and moves the first moving plate in the second axial direction by engaging with the first moving plate; and a second adjusting driver that moves the second moving plate in the second axial direction, in which the first moving plate and the second moving plate are superposed onto the fixing plate in the projection direction or in a direction opposite to the projection direction, and the first moving plate is movably abutted on the fixing plate to support and fix the projection optical device.

Here, the first axial direction can be set in a vertical axis direction (vertical direction) to which the weight of the projector is applied and the second axial direction can be set in a horizontal axis direction (horizontal direction) which is orthogonal to the vertical axis direction while the projector is set at a predetermined position. Contrary, the second axial direction can be set in the vertical axis direction (vertical direction) and the first axial direction can be set in the horizontal axis direction (horizontal direction).

The first adjusting driver and the second adjusting driver may employ any structures as long as the first moving plate can be moved in the first axial direction and the second moving plate can be moved in the second axial direction.

According to the invention, the projection optical device is supported and fixed by the first moving plate. The first moving plate is moved in the first axial direction by driving the first adjusting driver. Namely, the projection optical device is moved in the first axial direction, so that the projection position can be adjusted in the first axial direction. The second moving plate is moved in the second axial direction by driving the second adjusting driver. At this time, the first moving plate is moved in the second axial direction along with the second moving plate since the second moving plate is engaged with the first moving plate. Namely, the projection optical device is moved in the second axial direction, so that the projection position can be adjusted in the second axial direction.

Therefore, the projection position of the projection optical device can be adjusted in the two axes directions orthogonal to each other in a plane orthogonal to the projection direction, thus enhancing convenience of the projector.

Incidentally, other structures are considerable to adjust the projection position in the first axial direction and the second axial direction as follows.

For instance, the first moving plate is attached to the fixing plate movably in the first axial direction. Then, the second moving plate is engaged with the first moving plate movably in the second axial direction. The projection optical device is supported and fixed by the second moving plate. In this arrangement, the second moving plate is moved in the first axial direction along with the first moving plate by moving the first moving plate in the first axial direction. That is, the projection optical device is moved in the first axial direction, so that the projection position can be adjusted in the first axial direction. Then, the projection optical device is moved in the second axial direction by moving the second moving plate in the second axial direction relative to the first moving plate, so that the projection position can be moved in the second axial direction.

However, according to the above-described arrangement, since the second moving plate for supporting and fixing the projection optical device is attached to the fixing plate via the first moving plate, the projection position likely waves when adjusting the projection position in case that a gap is generated among the respective components due to manufacturing tolerance or the like of the first moving plate and the second moving plate, and it is difficult to adjust the projection position highly accurately.

According to the invention, since the first moving plate for supporting and fixing the projection optical device is movably abutted on the fixing plate, the first moving plate moves along the fixing plate. Therefore, as compared to the above arrangement, the first moving plate will not vibrate when the first moving plate for supporting and fixing the projection optical device is moved, namely, the projection position will not wave when adjusting the projection position, thus adjusting the projection position highly accurately.

Preferably, in the projector, the first moving plate may support and fix the projection optical device by an end surface facing the fixing plate.

Note that, a portion (for instance, the flange) for supporting and fixing the projection optical device to the first moving plate is required to be inserted to the second moving plate and fixed to an end surface of the first moving plate opposite to an end surface facing the fixing plate when the first moving plate supports and fixes the projection optical device with the end surface of the first moving plate opposite to the end surface facing the fixing plate. Therefore, such a structure in which the portion can be inserted is required to be formed at the second moving plate, thus the structure of the second moving plate being complicated. Further, considering the strength of the second moving plate, the second moving plate must be formed larger, and consequently, the projection position adjuster cannot be downsized.

According to the invention, such a structure to which the portion can be inserted is not required to be formed at the second moving plate because the projection optical device is supported and fixed by the end surface of the first moving plate facing the fixing plate, thus simplifying the structure of the second moving plate. Additionally, the strength of the second moving plate can preferably be maintained, the second moving plate can be downsized, and consequently, the projection position adjuster can be downsized.

Preferably, in the projector, the projection position adjuster may include: an assisting plate abutted on the fixing plate and disposed so that the first moving plate and the second moving plate can be sandwiched between the fixing plate and the assisting plate; and a biasing member interposed between the first moving plate and the second moving plate, and/or between the second moving plate and the assisting plate, the biasing member biasing the second moving plate relative to at lease one of the first moving plate and the assisting plate.

According to the invention, since the biasing member is interposed at least one position of between the first moving plate and the second moving plate, and between the second moving plate and the assisting plate, the second moving plate can be biased to at least one of the first moving plate and the assisting plate. Therefore, the biasing member can fill the gap generated due to manufacturing tolerance or the like between the second moving plate and the first moving plate and/or the assisting plate, so that the second moving plate will not vibrate when the second moving plate is moved in the second axial direction, and the second moving plate can smoothly be moved. Since the biasing member is interposed in the above-described manner, the first moving plate is also biased to the fixing plate, and consequently, the first moving plate can smoothly be moved relative to the fixing plate. Accordingly, the projection position will not wave when moving the respective moving plates and adjusting the projection position, thus further highly accurately adjusting the projection position.

Preferably, in the projector, the second moving plate may be engaged with the assisting plate in a manner movable in the second axial direction, and the projection position adjuster may include: a base disposed at the second moving plate in the first axial direction for restricting the movement of the second moving plate in the first axial direction; and a biasing member interposed between the base and the second moving plate for biasing the second moving plate in the first axial direction relative to the assisting plate.

According to the invention, since the biasing member is interposed between the base and the second moving plate, the second moving plate can be biased to the assisting plate. Therefore, the biasing member can fill the gap generated due to manufacturing tolerance or the like between the second moving plate and the assisting plate, so that the second moving plate will not vibrate when the second moving plate is moved in the second axial direction, and the second moving plate can smoothly be moved. Accordingly, the projection position will not wave when moving the second moving plate in the second axial direction and adjusting the projection position in the second axial direction, thus further highly accurately adjusting the projection position.

Preferably, in the projector, the biasing member may have a cylindrical profile, and a recess where the biasing member is disposed may be formed on at least one of an end surface of the first moving plate facing the second moving plate and an end surface of the second moving plate on the first axial direction side.

According to the invention, since the biasing member has a cylindrical profile, for instance, if the biasing member is a molding product made of resin material or the like formed by molding process, the biasing member can easily be manufactured and reduced in manufacturing cost, and the projection position adjuster can be reduced in weight.

Further, since the recess is formed in at least one of an end surface of the first moving plate facing the second moving plate and an end surface of the second moving plate on the first axial direction side, the biasing member can disposed at the recess, thus moving the biasing member along with the movement of the first moving plate and the second moving plate. Therefore, the biasing state by the biasing member can preferably be maintained and the projection position will not vibrate when adjusting the projection position, thus adjusting the projection position further highly accurately.

Preferably, in the projector, the biasing member may be disposed at the recess so that a cylindrical axis of the biasing member is orthogonal to a moving direction of the moving plate where the biasing member is disposed out of the first moving plate and the second moving plate.

According to the invention, since the biasing member is disposed at the recess so that the cylindrical axis is orthogonal to the moving direction of the moving plate where the biasing member is disposed, the cylindrical end of the biasing member in the axial direction will not mechanically interfere with other components (for example, the second moving plate and the base) when the moving plate is moved, thus smoothly moving the moving plate.

Preferably, in the projector, the projection optical device may include: a plurality of lenses; and a lens barrel where the plurality of lenses are housed so that relative positions of the plurality of lenses can be changed, and the projection position adjuster may include: a base attached to the fixing plate; a lever movably attached to the base; and a relative position changing section attached to the lens barrel of the projection optical device for changing the relative positions of the plurality of lenses of the lens barrel according to movement of the lever, in which the lever and the relative position changing section are engaged to each other and have an engaging structure that can change an engaging state according to movement of the projection optical device in the first axial direction and the second axial direction.

According to the invention, since the projection position adjuster includes the base, the lever and the relative position changing section, not only the projection position, but also the zoom and the focus of the projection image can be adjusted by changing the relative positions of the plurality of lenses.

Further, since the engaging structure between the lever and the relative position changing section can change the engaging state according to the movement of the projection optical device in the first axial direction and the second axial direction, the zoom and the focus of the projection image can be adjusted even when the projection optical device is moved.

BRIEF DESCRIPTION OF THE DRAWINGS

The invention will be described with reference to the accompanying drawings, wherein like numbers reference like elements, and wherein.

DETAILED DESCRIPTION OF PREFERRED EMBODIMENT(S)

An embodiment of the invention will be described below with reference to the attached drawings.

[1. Exterior Arrangement]

Figure 1:
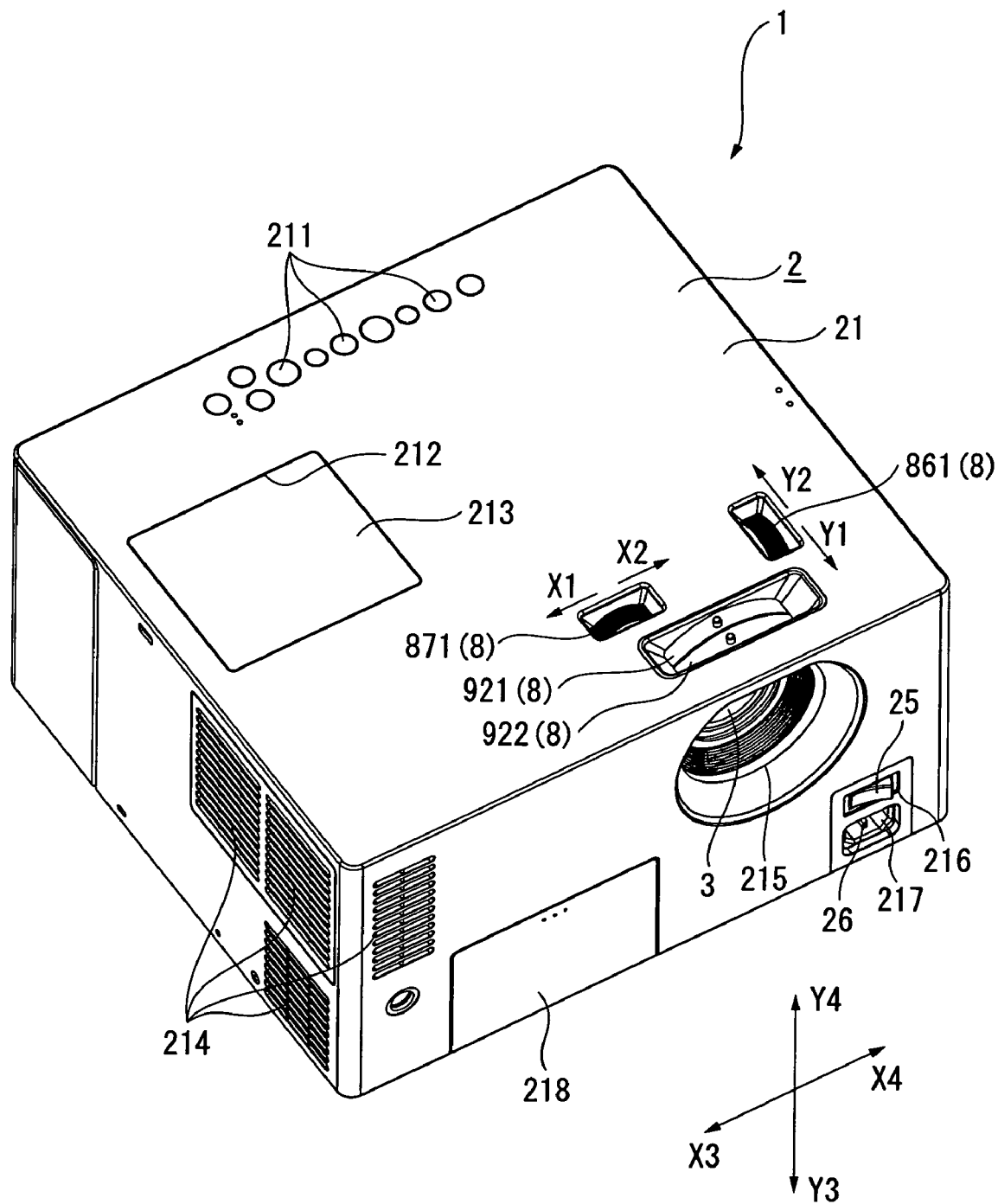
FIG. 1 is a perspective view showing an upper front side of a projector according to the present embodiment.

FIG. 1 is a perspective view showing an upper front side of a projector 1 according to the present embodiment.

The projector 1 modulates a light beam irradiated by a light source in accordance with image information and projects the light beam on a projection surface such as a screen in an enlarged manner. As shown in FIG. 1, the projector 1 includes a substantially rectangular parallelepiped exterior case 2 and a projection lens 3 as a projection optical device exposed from the exterior case 2.

The projection lens 3 is a lens set including a plurality of lenses housed in a cylindrical lens barrel 31 (see FIG. 8), the projection lens 3 projecting an optical image modulated by the device body of the projector 1 in an enlarged manner in accordance with image information. The projection lens 3 has a flange 32 (see FIG. 8) having a substantially rectangular profile in plan view and extending outward from the outer periphery on the base end side of the lens barrel 31, so that the flange 32 connects the projection lens 3 to the later-described projection position adjuster.

Though it is not illustrated in detail, the lens barrel 31 is configured by connecting a plurality of components to support the plurality of lenses by the plurality of components. At least two components of the plurality of components can rotate relative to other components. When at least two components described above are rotated, the relative positions of the plurality of lenses of the projection lens 3 can be changed in order to adjust zoom and focus of the projection image.

The exterior case 2 is made of synthetic resin and houses the device body of the projector 1. As shown in FIG. 1, the exterior case 2 includes an upper case 21 covering the upper part of the device body and a lower case 22 (see FIGS. 2 and 3) covering the lower part of the device body.

The upper case 21 is formed like a container for forming the top surface, the front surface, the lateral surfaces and the rear surface of the exterior case 2.

As shown in FIG. 1, a plurality of operation buttons 211 for performing the adjustment operation of the projector 1 are exposed substantially from the rear center of the top surface of the upper case 21 to extending in horizontal direction. Pushing these operation buttons 211 causes contact with tactile switches mounted on a circuit board (not shown) disposed inside to allow desired operations.

Note that, the circuit board described above is electrically connected to the below-described control board, so that operation signals generated by pressing the operation buttons 211 are output to the control board.

As shown in FIG. 1, two dials 861 and 871, and two levers 921 and 922 of the projection position adjuster 8 (see FIGS. 5 to 7) are exposed from the top surface on the front and right side as seen from the front for adjusting the projection position as well as the zoom and the focus of the projection lens 3.

When the dial 861 out of the two dials 861 and 871 is rotated in Y1 direction (forward), the projection lens 3 is moved in Y3 direction (downward), and when the dial 861 is rotated in Y2 direction (backward), the projection lens 3 is moved in Y4 direction (upward). On the other hand, when the dial 871 is rotated in X1 direction (rightward as seen from the rear side of the projector 1), the projection lens 3 is moved in X3 direction (rightward), and when the dial 871 is moved in X2 direction (leftward as seen from the rear side of the projector 1), the projection lens 3 is moved in X4 direction (leftward).

When the lever 921 out of the two levers 921 and 922 is moved horizontally, the relative positions of the plurality of lenses of the projection lens 3 are changed, thus adjusting the zoom of the projection image. On the other hand, when the lever 922 is moved horizontally, the relative positions of the plurality of lenses of the projection lens 3 are changed, thus adjusting the focus of the projection image.

Note that, the structure of the projection position adjuster 8 will be described later in detail.

As shown in FIG. 1, a rectangular opening 212 is formed in the top surface on the left and rear side as seen from the front, to which a lamp cover 213 is engaged. By disassembling the lamp cover 213, the later-described light source device constituting the device body of the projector 1 can be replaced through the opening 212.

Further in the upper case 21, as shown in FIG. 1, an exhaust port 214 is formed in the lateral surface on the left side as seen from the front to exhaust the air inside the exterior case 2 to the outside.

As shown in FIG. 1, there is a dent in the front surface of the upper case 21 on the right side as seen from the front denting toward the inside of the exterior case 2, and a substantially circular opening 215 is formed at the center of the dent. The opening 215 exposes the tip end of the projection lens 3.

As shown in FIG. 1, two openings 216 and 217 are formed below the opening 215. The opening 216 out of the openings 216 and 217 exposes a power supply switch 25 switching the ON/OFF state of the projector 1. On the other hand, the opening 217 exposes an inlet connector 26, so that the electric power of the outside can be supplied to the device body of the projector 1.

As shown in FIG. 1, an interface cover 218 is provided on the front surface on the left side as seen from the front, so that a plurality of connector terminals (not shown) for inputting an image signal, a sound signal and the like from the external electric equipment is exposed when opening the interface cover 218. An interface board (not shown) for processing the input signal is connected to the plurality of connector terminals.

Incidentally, the interface board is electrically connected to the below-described control board and the signal processed by the interface board is output to the control board.

As shown in FIG. 1, an exhaust port 214 is formed in the front surface on the left side as seen from the front for discharging the air inside the exterior case 2 to the outside in the same manner as the above-described exhaust port 214 formed in the lateral surface.

[2. Interior Arrangement]

Figure 2:
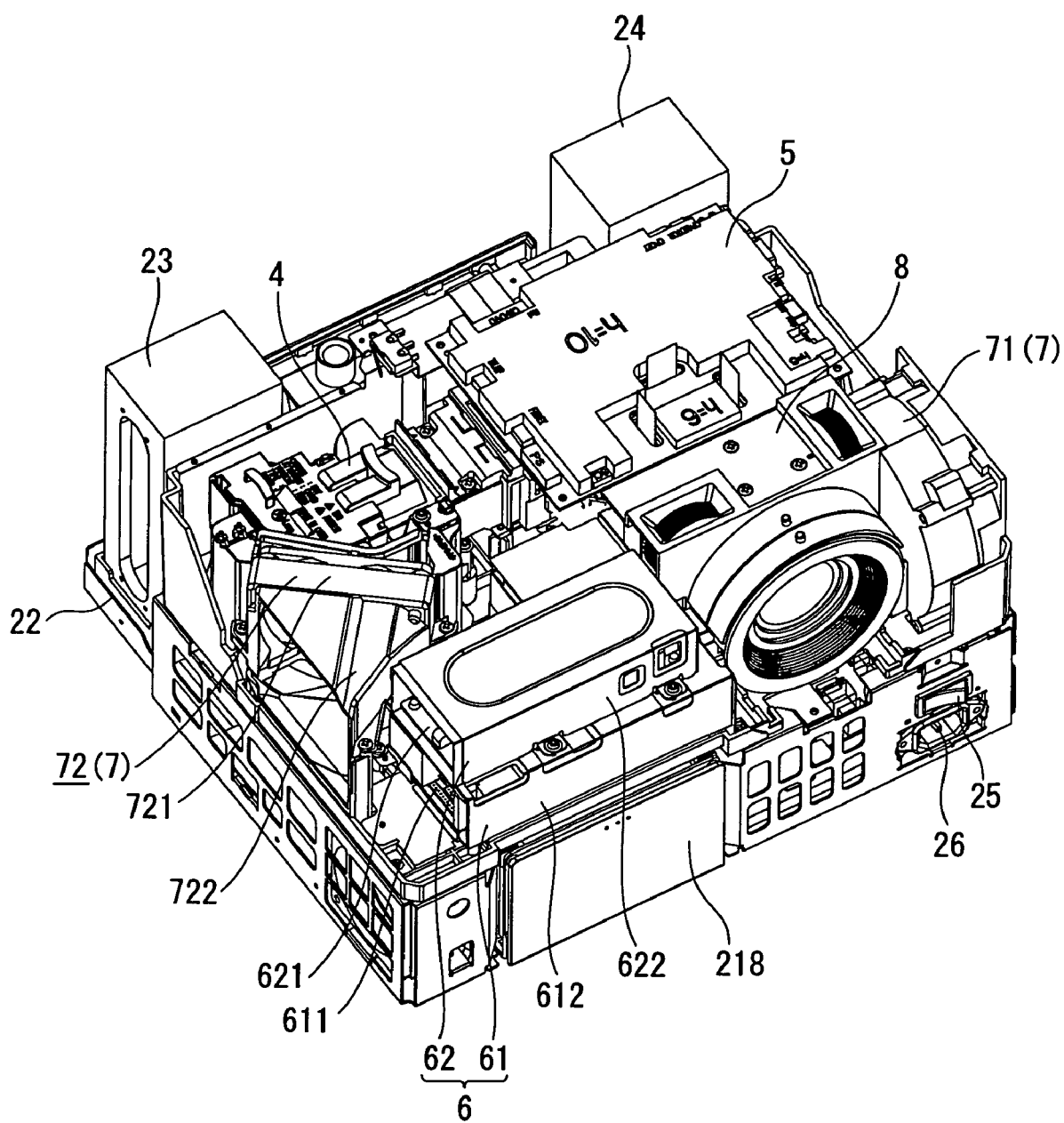
FIG. 2 is an illustration showing the interior arrangement of the projector of the aforesaid embodiment.
Figure 3:
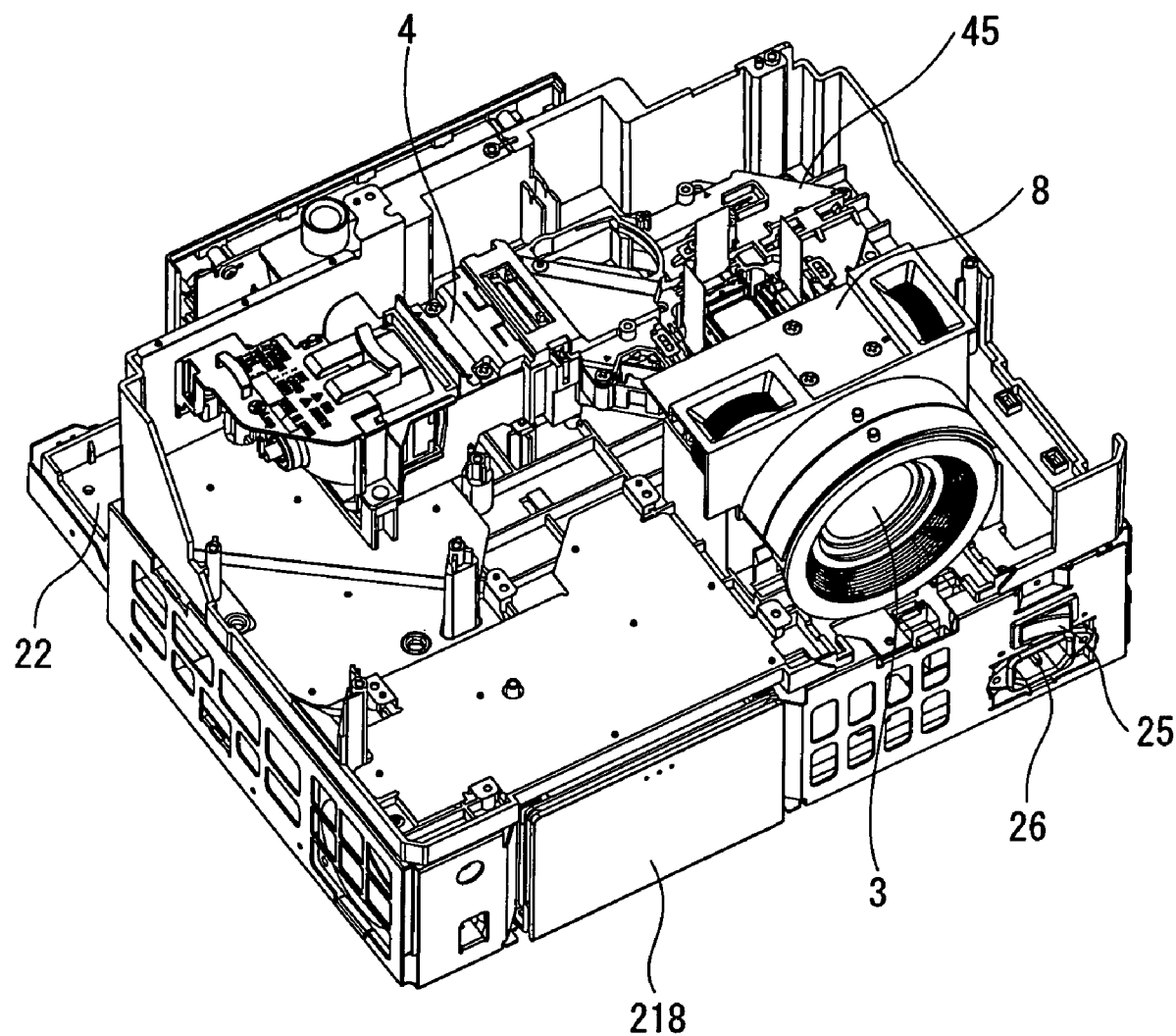
FIG. 3 is an illustration showing the interior arrangement of the projector of the aforesaid embodiment.

FIGS. 2 and 3 are an illustrations each showing the interior arrangement of the projector 1. Specifically, FIG. 2 is an illustration in which the upper case 21 is removed from the state shown in FIG. 1. FIG. 3 is an illustration in which a power source unit, a cooling unit, a control board and a speaker are further removed from the state shown in FIG. 2.

As shown in FIG. 2 or 3, the device body of the projector 1 is housed in the exterior case 2 includes an optical unit 4 extending horizontally along longitudinal direction of the exterior case 2 and substantially formed in an L-shape in plan view with an end extending to the front, a control board 5 (FIG. 2) disposed above the optical unit 4, a power source unit 6 (FIG. 2) disposed on the inner side of the L-shape of the optical unit 4, a cooling unit 7 (FIG. 2) for cooling the inside of the exterior case 2, and the projection position adjuster 8 that adjusts the position as well as the zoom and the focus of the projection lens 3.

[2-1. Structure of Optical Unit]

Figure 4:
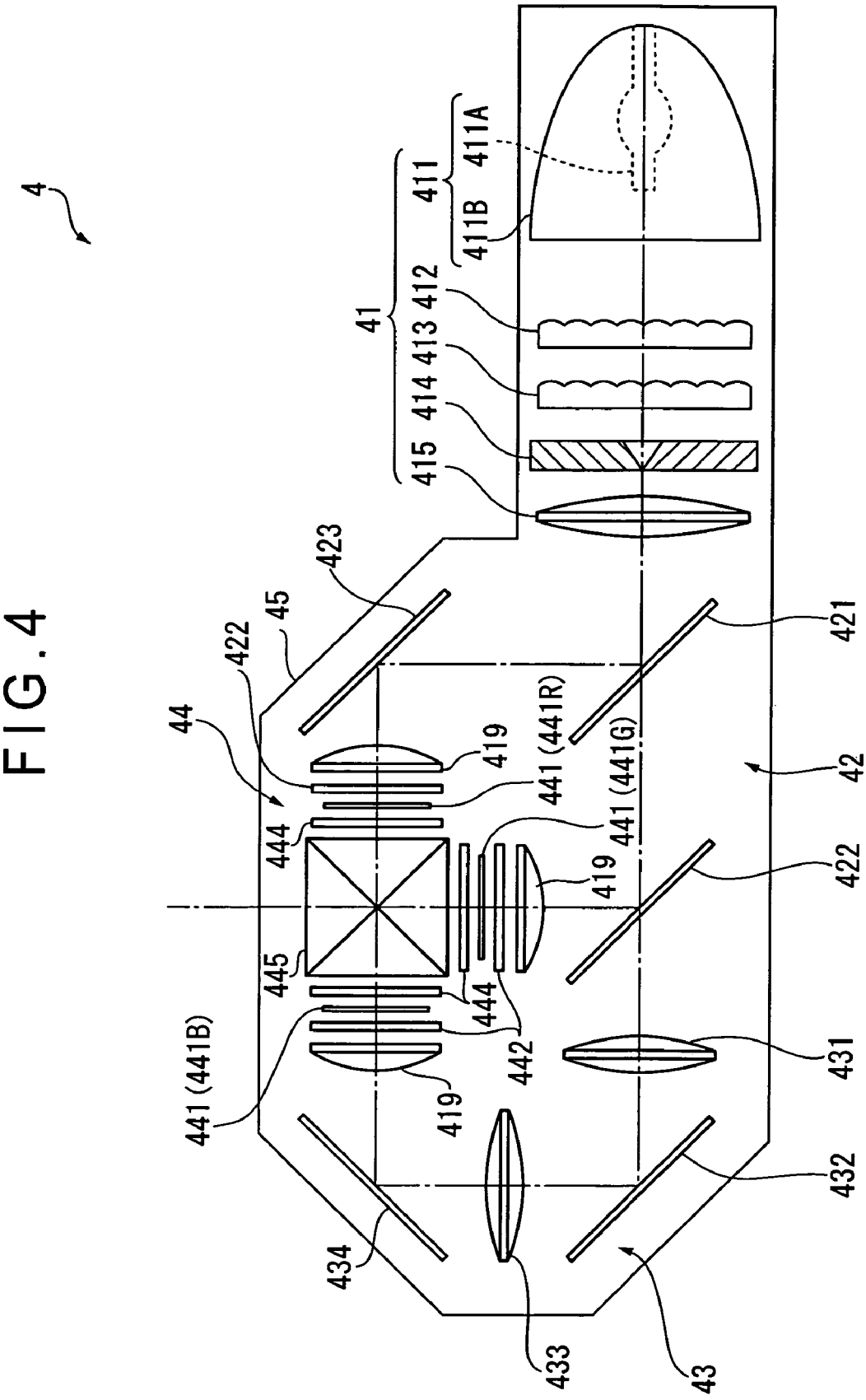
FIG. 4 is a schematic illustration showing an optical system of an optical unit of the aforesaid embodiment.

FIG. 4 is a schematic illustration showing an optical system of the optical unit 4.

The optical unit 4 forms an optical image by modulating a light beam irradiated by a light source in accordance with image information. As shown in FIG. 4, the optical unit 4 includes an integrator illuminating optical system 41, a color-separating optical system 42, a relay optical system 43, an optical device 44, and an optical component casing 45 in which the optical components 41, 42, 43 and 44 are housed and arranged, which are functionally independent from each other.

The integrator illumination optical system 41 is an optical system for equalizing the illuminance of the light beam irradiated by the light source on a plane orthogonal to the illumination optical axis. The integrator illuminating optical system 41 has a light source device 411, a first lens array 412, a second lens array 413, a polarization converter 414 and a superposing lens 415.

The light source device 411 includes a light source lamp 411A as a radial light source and a reflector 411B. The radial light beam irradiated by the light source lamp 411A is reflected by the reflector 411B to be an approximately parallel light beam and is irradiated toward the outside. In the present embodiment, a high-pressure mercury lamp is used as the light source lamp 411A and a parabolic mirror is used as the reflector 411B. Incidentally, the light source lamp 411A may not be a high-pressure mercury lamp but may be a metal halide lamp or a halogen lamp. Further, though a parabolic mirror is used as the reflector 411B, a parallelizing concave lens disposed on the irradiation-side of a reflector of an ellipsoidal mirror may alternatively be used.

The first lens array 412 has small lenses arranged in a matrix, the lenses having substantially rectangular profile seen in the illumination optical axis direction. The respective lenses separate the light beam irradiated by the light source lamp 411A into sub-beams and emits the sub-beams in the illumination optical axis direction.

The second lens array 413 is arranged approximately in the same manner as the first lens array 412, which includes small lenses arranged in a matrix. The second lens array 413 focuses the image of the small lenses of the first lens array 412 onto the liquid crystal panels (described later) of the optical device 44 together with the superposing lens 415.

The polarization converter 414 converts the light from the second lens array 413 into substantially uniform polarized light, thereby enhancing the light utilization efficiency of the optical device 44.

Specifically, the respective sub-beams converted into the substantially uniform polarized light by the polarization converter 414 is substantially superposed on each of the liquid crystal panels (described later) of the optical device 44 by the superposing lens 415 finally. Since only one-type of polarized light can be used in a projector using the liquid crystal panels that modulate a polarized light, approximately half of the light beam from the light source lamp 411A emitting random polarized light cannot be used. Accordingly, with the use of the polarization converter 414, the light beam irradiated by the light source lamp 411A is converted into substantially uniform polarized light to enhance the light utilization efficiency of the optical device 44. Incidentally, such polarization converter 414 is disclosed in, for instance, JP08-304739A.

The color-separating optical system 42 has two dichroic mirrors 421 and 422, and a reflection mirror 423. The plurality of sub-beams irradiated by the integrator illuminating optical system 41 are separated into three color lights of red (R), green (G) and blue (B) by the two dichroic mirrors 421 and 422.

The relay optical system 43 has an incident-side lens 431, a relay lens 433, and reflection mirrors 432 and 434. The relay optical system 43 guides the color light (blue light) separated by the color-separating optical system 42 toward the below-described liquid crystal panel for blue light of the optical device 44.

At this time, the dichroic mirror 421 of the color-separating optical system 42 transmits the green light component and blue light component of the light beam irradiated by the integrator illuminating optical system 41 and reflects the red light component. The red light reflected by the dichroic mirror 421 is reflected by the reflection mirror 423, and reaches the liquid crystal panel for red light through the field lens 419. The field lens 419 converts the respective sub-beams irradiated from the second lens array 413 into a light beam parallel to the central axis (main beam) thereof. The field lenses 419 provided on the light-incident side of other liquid crystal panels for blue light and green light function in the same manner.

In the blue and green lights transmitted through the dichroic mirror 421, the green light is reflected by the dichroic mirror 422, which reaches the liquid crystal panel for green light through the field lens 419. On the other hand, the blue light passes through the dichroic mirror 422 and the relay optical system 43 to reach the liquid crystal panel for blue light through the field lens 419.

Note that, the relay optical system 43 is used for the blue light in order to avoid deterioration in the light utilization efficiency on account of light dispersion and the like caused by the longer length of the optical path of the blue light than the optical path of the other color light. In other words, the relay optical system 43 is used for directly transmitting the sub-beams incident on the incident-side lens 431 to the field lens 419. Incidentally, though the blue light of the three color lights passes through the relay optical system 43, the red light, for instance, may alternatively pass through the relay optical system 43.

The optical device 44 modulates the incident light beam in accordance with image information to form a color image. The optical device 44 has three incident-side polarization plates 442 to which the respective color lights separated by the color-separating optical system 42 enter, the liquid crystal panels 441 (hereafter, 441R for red light, 441G for green light and 441B for blue light) as optical modulators and irradiation-side polarization plates 444 disposed on the downstream of the respective incident-side polarization plates 442, and a cross dichroic prism 445.

The liquid crystal panels 441 each use, for instance, a polycrystalline silicon TFT (Thin Film Transistor) as a switching element, which has a pair of opposing transparent substrates with liquid crystal sealed therebetween. The liquid crystal panels 441 modulate and irradiate the light beam incident thereon through the incident-side polarization plates 442 in accordance with image information.

The incident-side polarization plate 442 only transmits a polarized light in a predetermined direction out of the respective color lights separated by the color-separating optical system 42 and absorbs the other light beam, which has a substrate made of sapphire glass or the like with a polarization film attached thereon.

The irradiation-side polarization plate 444 is also arranged substantially in the same manner as the incident-side polarization plate 442, which only transmits the polarized light in a predetermined direction out of the light beam irradiated by the liquid crystal panels 441 and absorbs other light beams, in which the polarization axis of the transmitted polarized light is set orthogonal to the polarization axis of the polarized light transmitted through the incident-side polarization plate 442.

The cross dichroic prism 445 combines the optical image irradiated by the irradiation-side polarization plate 444 and modulated for each color light to form a color image. In the cross dichroic prism 445, a dielectric multi-layer film for reflecting the red light and a dielectric multi-layer film for reflecting the blue light are formed along the boundaries of four right-angle prisms approximately in an X-shape, the dielectric multi-layer films combining the three color lights.

[2-2. Structure of Control Board]

The control board 5 is a circuit board having a processor such as a CPU (Central Processing Unit) mounted thereon, which controls the operation of the entire projector 1. For example, the control board 5 drives and controls the liquid crystal panels 441 based on the signal output from the above-described interface board. The liquid crystal panels 441 form the optical image by optically modulating. Additionally, the control board 5, for instance, amplifies sound signal output from the above-described interface board to output a predetermined signal from speakers 23 and 24 (FIG. 2) respectively disposed at the rear corners of the exterior case 2. Then the speakers 23 and 24 output sound based on the input signal. Further, the control board 5, for instance, inputs an operation signal output from the circuit board connected to the above-described operation buttons 211 to adequately output control command to the components of the projector 1 based on the operation signal.

[2-3. Arrangement of Power Source Unit]

The power source unit 6 supplies the electric power to the light source device 411 and the control board 5 etc., and is disposed along the front surface of the exterior case 2 as shown in FIG. 2. As shown in FIG. 2, a power source block 61 equipped with a power supply circuit and a lamp drive block 62 are superposed to each other in the power source unit 6.

The power source block 61 supplies the electric power supplied from the outside through the power cable connected to the inlet connector 26 to the lamp drive block 62 and the control board 5 etc. The power source block 61 has a circuit board 611 having a transformer for converting the input alternate-current into a predetermined voltage and a converter for converting the output of the transformer into direct-current with a predetermined voltage on one side thereof, and a tube component 612 covering the circuit board. The tube component 612 is made of aluminum and is formed in an approximately box-shape with both ends being opened.

The lamp drive block 62 includes a circuit board 621 having on one side thereof a converter for supplying the electric power to the above-described light source device 411 at a constant voltage. The alternate-current electricity input from the power source block 61 is commutated and converted into the direct-current electricity or the alternate-current electricity in rectangular wave by the lamp drive block 62 to be supplied to the light source device 411 (FIG. 4). Further, the lamp drive block 62 has a tube component 622 covering the circuit board 621 in the same manner as the tube component 612 of the power source block 61.

[2-4. Arrangement of Cooling Unit]

The cooling unit 7 cools the components generating heat inside the projector 1. As shown in FIG. 2, the cooling unit 7 includes a sirocco fan 71 for introducing the outside cooling air to the inside of the projector 1, and an exhaust device 72 for discharging the air inside the projector 1 to the outside.

The sirocco fan 71 is located beside the projection lens 3, so that the intake surface faces an intake port (not shown) formed on the right surface of the upper case 21 as seen from the front and the discharge surface faces the rear side.

Though not shown in detail, a duct is connected to the discharge port of the sirocco fan 71. The cooling air discharged from the sirocco fan 71 is introduced to the lower side of the optical device 44 of the optical unit 4 by the duct, and circulated from the lower side to the upper side through the gap formed between the liquid crystal panels 441 and the cross dichroic prism 445.

As shown in FIG. 2, the exhaust device 72 includes an axial-flow fan 721 and a duct 722.

As shown in FIG. 2, in the axial-flow fan 721, the intake surface faces the light source device 411 and the discharge surface faces the left surface of the upper case 21 of the exterior case 2 as seen from the front.

The duct 722 is connected to the discharge surface of the axial-flow fan 721 to introduce the air discharged from the axial-flow fan 721 to the exhaust port 214 formed on the lateral surface of the upper case 21.

In other words, the air inside the projector 1, particularly, the air near the light source device 411 is sucked by the exhaust device 72 and discharged to the outside of the projector 1 though the exhaust port 214.

[2-5. Structure of Projection Position Adjuster]

Figure 5:
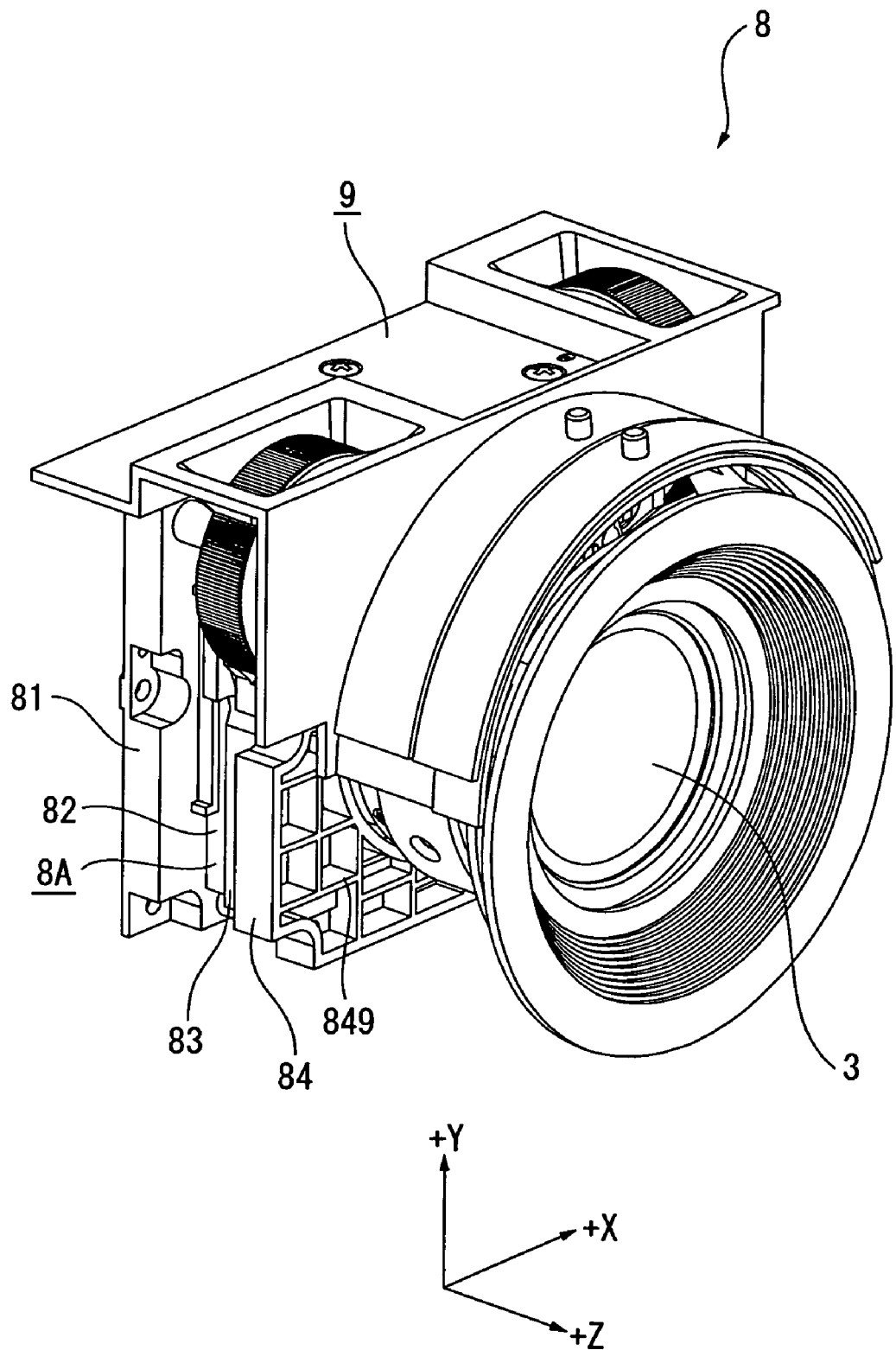
FIG. 5 is a perspective view showing the structure of a projection position adjuster of the aforesaid embodiment.
Figure 6:
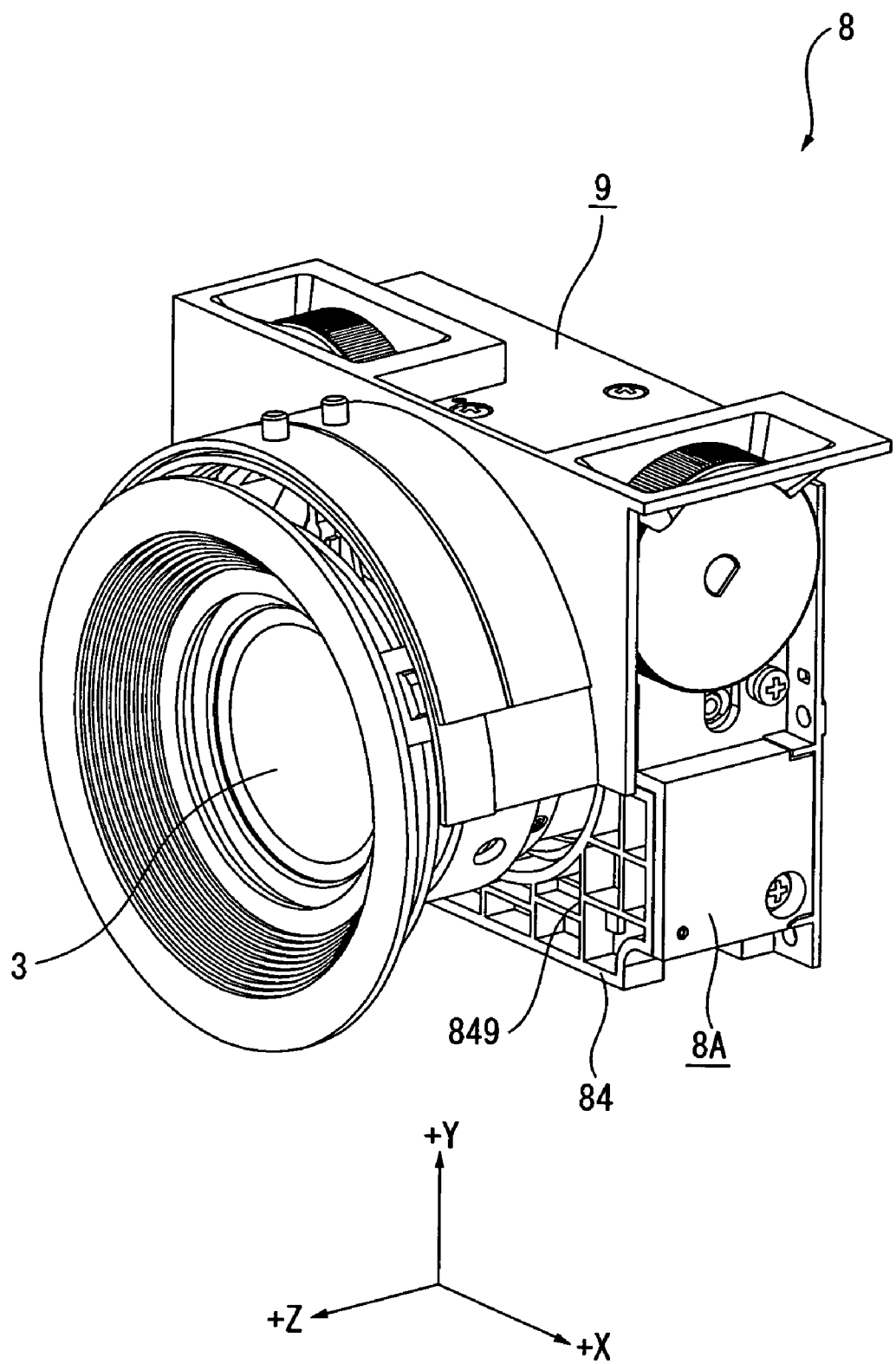
FIG. 6 is an illustration showing the structure of the projection position adjuster of the aforesaid embodiment.
Figure 7:
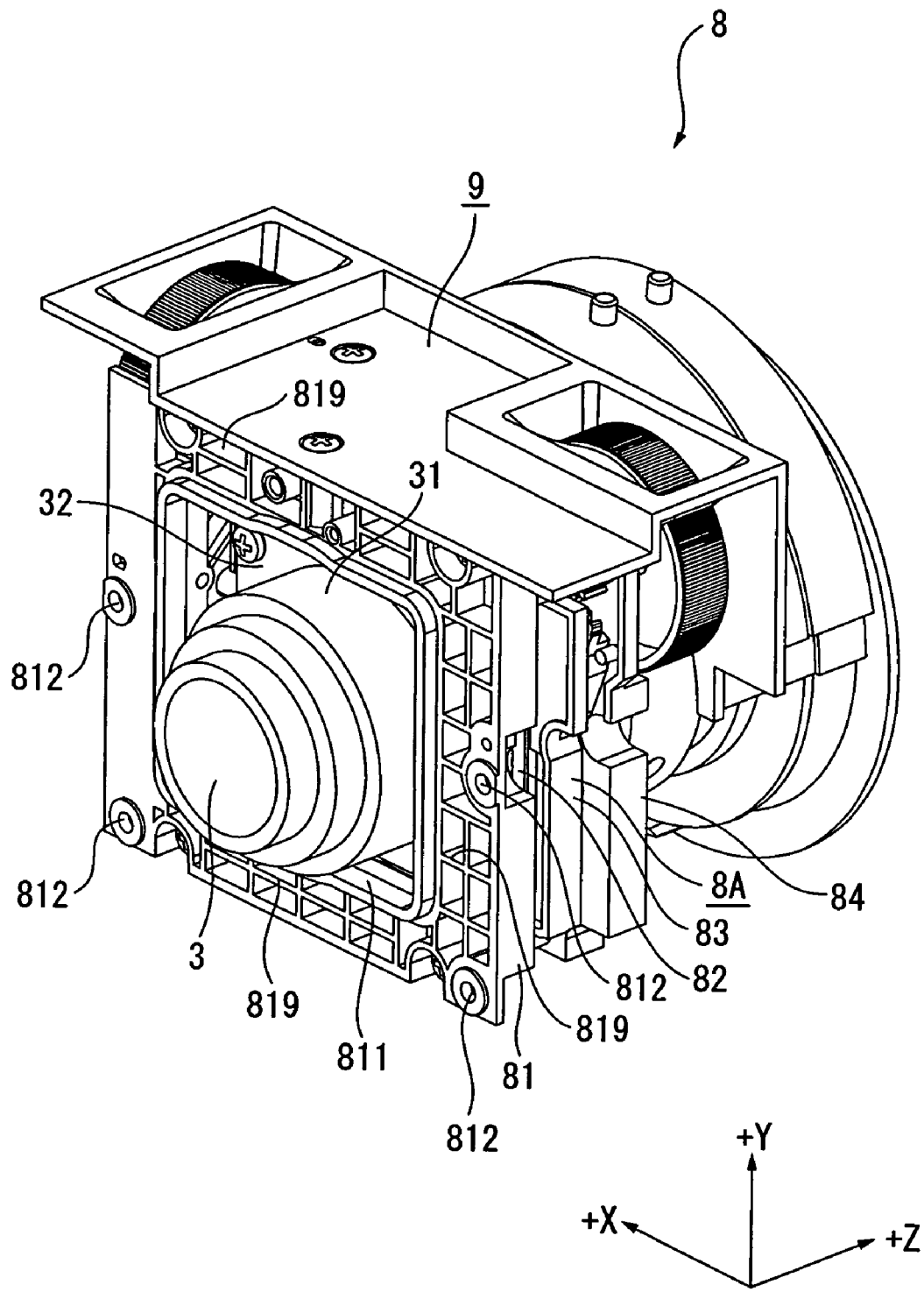
FIG. 7 is an illustration showing the structure of the projection position adjuster of the aforesaid embodiment.

FIGS. 5 to 7 are illustrations each showing the structure of the projection position adjuster 8. Specifically, FIGS. 5 and 6 are perspective views each showing the projection position adjuster 8 as seen from the front. FIG. 7 is a perspective view as seen from the rear side.

Assume that, in FIGS. 5 to 7, the projection direction of the projection lens 3 defines Z-axis, and two axes orthogonal to the Z-axis respectively define X-axis (horizontal axis) and Y-axis (vertical axis) for simplifying the description.

As shown in FIGS. 5 to 7, the projection position adjuster 8 includes a device body 8A and a zoom and focus adjuster 9.

Figure 8:
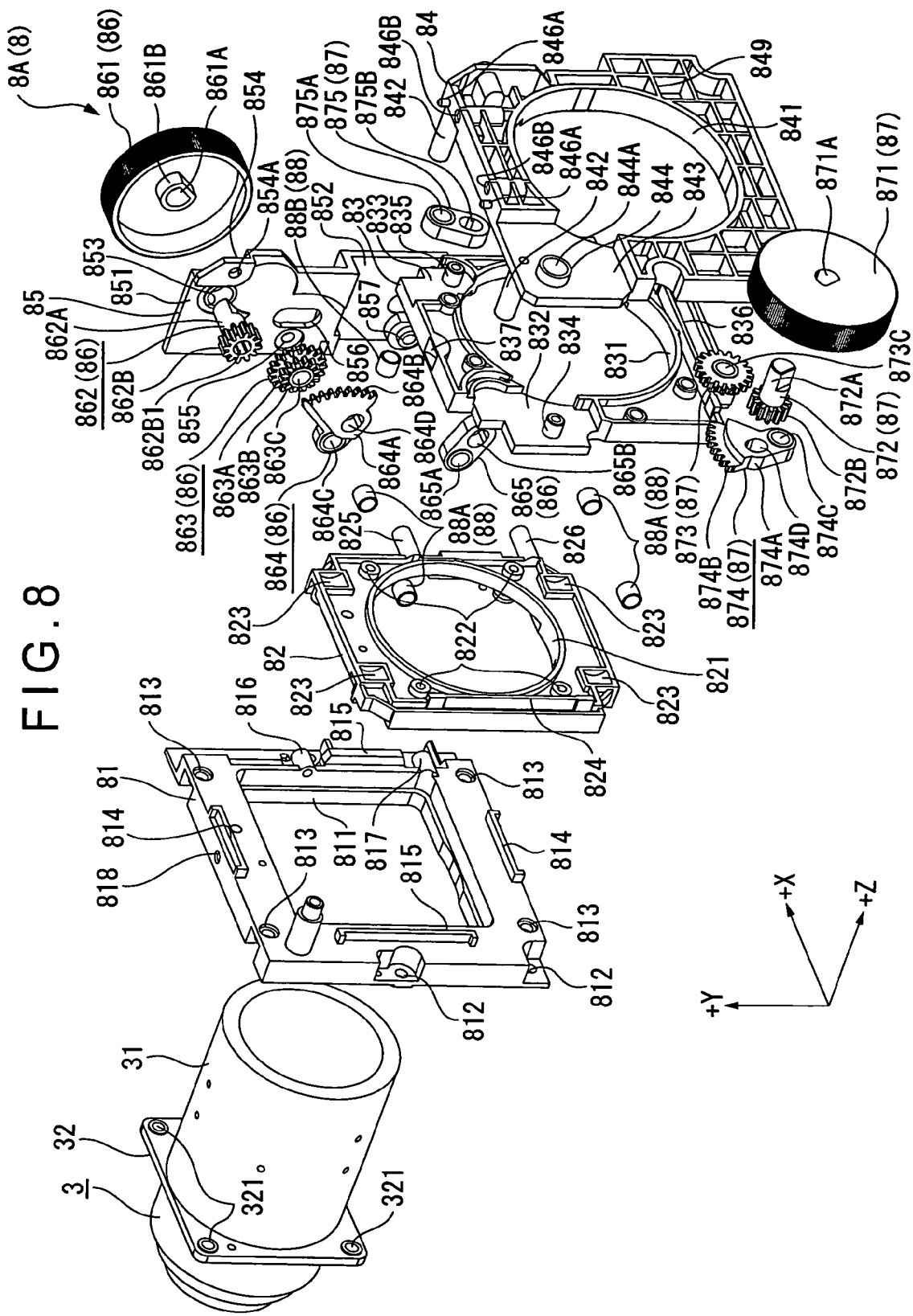
FIG. 8 is an exploded perspective view of a device body of the aforesaid embodiment.

FIG. 8 is an exploded perspective view of the device body 8A. Assume that, in FIG. 8, the projection direction from the projection lens 3 defines Z-axis, and two axes orthogonal to the Z-axis respectively define X-axis (horizontal axis) and Y-axis (vertical axis) for simplifying the description in the same manner as FIGS. 5 to 7.

The device body 8A adjusts the projection position of the projection lens 3. As shown in FIG. 8, the device body 8A includes a fixing plate 81, a first moving plate 82, a second moving plate 83, an assisting plate 84, a supporting plate 85, a first adjusting driver 86, a second adjusting driver 87 and a biasing member 88.

The fixing plate 81 is a portion fixed to the optical component casing 45 (FIG. 3) for entirely supporting the projection position adjuster 8. As shown in FIG. 8, the fixing plate 81 substantially has a rectangular shape in plan view.

As shown in FIG. 7 or 8, an opening 811 having a rectangular shape in plan view is formed substantially at the center of the fixing plate 81 so that the flange 32 of the projection lens 3 can be inserted.

The first moving plate 82 slides on the peripheral edge of the opening 811 at the end surface of the fixing plate 81 in +Z-axis direction.

As shown in FIG. 7 or 8, fixing holes 812 with steps having smaller thickness than other parts are formed in the fixing plate 81 at the corners on −Y-axis direction side (lower side) and substantially at the center in the Y-axis direction of the both ends in the X-axis direction. The fixing plate 81 is fixed by screwing screws (not shown) to screw holes (not shown) formed on the lateral surface of the optical component casing 45 through these fixing holes 812.

As shown in FIG. 8, fixing holes 813 are respectively formed near the four corners of the fixing plate 81 for connecting to the assisting plate 84.

As shown in FIG. 8, end position regulators 814 are respectively projected from the fixing plate 81 at the both ends in the Y-axis direction on the end surface in the +Z-axis direction to regulate the end position of the first moving plate 82 when the first moving plate 82 moves in the Y-axis direction (vertical direction).

As shown in FIG. 8, the end position regulators 814 project in the +Z-axis direction and extend in the X-axis direction, which restrict the movement of the first moving plate 82 by the end in the Y-axis direction (upper and lower ends) of the first moving plate 82 abutting on the end position regulators 814 when the first moving plate 82 slides on the peripheral edge of the opening 811 of the fixing plate 81.

Similarly, as shown in FIG. 8, end position regulators 815 are respectively projected from the fixing plate 81 at the both ends in the X-axis direction on the end surface in the +Z-axis direction to regulate the end position of the first moving plate 82 when the first moving plate 82 moves in the X-axis direction (horizontal direction).

As shown in FIG. 8, the end position regulators 815 project in the +Z-axis direction and extend in the Y-axis direction, which restrict the movement of the first moving plate 82 by the end in the X-axis direction of the first moving plate 82 abutting on the end position regulators 815 as the first moving plate 82 slides in the same manner as the end position regulators 814.

As shown in FIG. 8, rotation shafts 816 and 817 are formed on the fixing plate 81 substantially at the center in the Y-axis direction on the end in the +X-axis direction and at the end in the −Y-axis direction (lower end side), which rotatably support the below-described driving gear and the linking portion of the first adjusting driver 86. Though not shown in detail, the rotation shafts 816 and 817 have screw holes therein along the X-axis as a portion for fixing the supporting plate 85.

As shown in FIG. 8, a screw hole 818 for fixing the below-described shift cover of the zoom and focus adjuster 9 is formed in the fixing plate 81 substantially at the center in the X-axis direction on the end in the +Y-axis direction (upper end).

As shown in FIG. 7, a plurality of reinforcing ribs 819 stand on the end surface of the fixing plate 81 in the −Z-axis direction. By providing such reinforcing ribs 819, the projection position adjuster 8 is less affected by the external force, thus preventing the projection position from being deviated due to the external force.

The first moving plate 82 is a rectangular shape in plan view having smaller dimensions than the rectangular area surrounded by the end position regulators 814 and 815 of the fixing plate 81 and is disposed on the +Z-axis direction side relative to the fixing plate 81 as shown in FIG. 5, 7 or 8. As shown in FIG. 8, the first moving plate 82 abuts on the peripheral edge of the opening 811 on the end surface in the +Z-axis direction of the fixing plate 81 so as to move in the Y-axis direction (first axial direction) and the X-axis direction (second axial direction). The first moving plate 82 supports and fixes the projection lens 3 to move the projection lens 3 in the Y-axis direction and the X-axis directions by moving the first moving plate 82.

As shown in FIG. 8, an opening 821 is formed substantially at the center of the first moving plate 82, the lens barrel 31 of the projection lens 3 being able to be inserted to the opening 821.

The opening 821 is formed with the external dimensions thereof being similar to that of the lens barrel 31 so that the gap with the outer periphery of the lens barrel 31 becomes smaller. Owing to this, it can be avoided that the light leaks from the gap between the lens barrel 31 and the opening 821 and dusts or the like invade the projector 1.

As shown in FIG. 8, screw holes 822 are formed at the four corners of the peripheral edge of the opening 821 in the first moving plate 82 corresponding to the fixing holes 321 of the flange 32 of the projection lens 3. The projection lens 3 is fixed to the first moving plate 82 by screwing screws (not shown) to the screw holes 822 through the fixing holes 321 of the flange 32 while the lens barrel 31 of the projection lens 3 is inserted to the opening 821 from the −Z-axis direction (side opposite to the projection direction). That is, the first moving plate 82 supports and fixes the projection lens 3 by the end surface facing the fixing plate 81.

As shown in FIG. 8, recesses 823 with the cross-section in a Y-Z plane substantially being semicircular are formed at the four corners of the end surface in the +Z-axis direction of the first moving plate 82. The biasing member 88 is disposed at the recesses 823.

As shown in FIG. 8, in the first moving plate 82, an engaging projection 824 is formed on the end surface in the +Z-axis direction on the end side in the −X-direction, which projects in the +Z-axis direction and extends in the Y-axis direction to engage with the second moving plate 83.

As shown in FIG. 8, in the first moving plate 82, moving projections 825 and 826 are projected substantially from the center in the Y-axis direction on the end in the +X-axis direction and from the end side in the −Y-axis direction (lower end side), which engage with the below-described driving gear and the linking portion of the first adjusting driver 86 to receive the force of the driving gear and the linking portion.

The second moving plate 83, as shown in FIG. 5, 7 or 8, has the same profile as the first moving plate 82, and is disposed on the +Z-axis direction side relative to the first moving plate 82. The second moving plate 83, which is movable in the X-axis direction, moves the first moving plate 82 by engaging with the first moving plate 82 to move in the X-axis direction.

Though not shown, an engaging recess extending in the Y-axis direction is formed on the end surface in the −Z-axis direction of the second moving plate 83 corresponding to the engaging projection 824 of the first moving plate 82. The engaging recess is formed to have greater length than the sum of the length of the engaging projection 824 in the Y-axis direction and the moving amount of the first moving plate 82 in the Y-axis direction. While the projection position adjuster 8 is assembled, the engaging projection 824 of the first moving plate 82 is inserted to the engaging recess of the second moving plate 83. The first moving plate 82 is moved in the Y-axis direction relative to the second moving plate 83 as guided by the engaging projection 824 and the engaging recess. The first moving plate 82 is moved in the X-axis direction along with the movement of the second moving plate 83 in the X-axis direction due to the engaging projection 824 and the engaging recess.

As shown in FIG. 8, an opening 831 is formed substantially at the center of the second moving plate 83 with the lens barrel 31 of the projection lens 3 being able to be inserted to the opening 821.

The opening 831 has a greater profile than the outer periphery of the lens barrel 31 so that the outer periphery of the lens barrel 31 does not mechanically interfere with the inner periphery of the opening 831 when the first moving plate 82 is moved relative to the second moving plate 83 and thus the projection lens 3 is moved.

As shown in FIG. 8, recesses 832 and 833 denting in the −Z-axis direction are respectively formed at the corners on the end surface in the +Z-axis direction on the +Y-axis direction side (upper side) of the second moving plate 83. A dial gear, an intermediate gear, a driving gear and a linking portion of the second adjusting driver 87 are respectively disposed at the recesses 832 and 833.

As shown in FIG. 8, a moving projection 834 is projected from the recess 832 in the +Z-axis direction, which engages with the driving gear and receives the force from the driving gear.

As shown in FIG. 8, a moving projection 835 is similarly projected from the recess 833 in the +Z-axis direction, which engages with the linking portion to receive the force from the linking portion.

As shown in FIG. 8, in the second moving plate 83, an engaging projection 836 is formed on the end surface in the +Z-axis direction on the end side in the −Y-axis direction, which projects in the +Z-axis direction and extends in the X-axis direction to engage with the assisting plate 84.

As shown in FIG. 8, a recess 837 with the cross-section in an X-Y plane being semicircular is formed substantially at the center in the X-axis direction of the end in the +Y-axis direction (upper end) of the second moving plate 83. The biasing member 88 is disposed at the recess 837.

As shown in FIG. 5, 7 or 8, the assisting plate 84 has a similar profile as the fixing plate 81, and is disposed on the +Z-axis direction side relative to the second moving plate 83 to sandwich the first moving plate 82 and the second moving plate 83 with the fixing plate 81.

As shown in FIG. 8, an opening 841 is formed substantially at the center of the assisting plate 84 with the lens barrel 31 of the projection lens 3 being able to be inserted to the opening 841.

The opening 841 has greater profile than the outer periphery of the lens barrel 31 so that the outer periphery of the lens barrel 31 does not mechanically interfere with the inner periphery of the opening 841 when the projection lens 3 is moved.

As shown in FIG. 8, in the assisting plate 84, connections 842 are formed on the end surface in the −Z-axis direction corresponding to the four fixing holes 813 of the fixing plate 81, the connections 842 projecting in the −Z-axis direction for connecting to the fixing plate 81. Although only two connections 842 on the +Y-axis direction side (upper side) are shown in FIG. 8, it is assumed that other two connections are provided on the −Y-axis direction side (lower side).

Tough not shown in detail, screw holes are formed inside these connections 842 along the Z-axis. The assisting plate 84 is fixed to the fixing plate 81 by screwing screws (not shown) to the screw holes of the connections 842 through the fixing holes 813 while the connections 842 are abutted on the fixing holes 813 of the fixing plate 81.

As shown in FIG. 8, a recess 843 denting in the −Z-axis direction is formed at the corner on the −X-axis direction side as well as on the end surface in the +Z-axis direction on the +Y-axis direction side (upper side) of the assisting plate 84. A dial 871 of the second adjusting driver 87 is disposed at the recess 843.

As shown in FIG. 8, in the recess 843, a shaft supporting portion 844 with an insertion hole 844A being formed therein is formed to project in the +Z-axis direction. The rotation shaft of the dial gear of the second adjusting driver 87 is inserted to the insertion hole 844A of the shaft supporting portion 844, so that the dial 871 and the dial gear are rotatably supported by the shaft supporting portion 844.

Rotation shafts 845A and 845B (see FIG. 10) are formed on the back surface of the recess 843 (end surface in the −Z-axis direction) to rotatably support the intermediate gear and the driving gear of the second adjusting driver 87.

A rotation shaft 845C (see FIG. 10) is formed at the corner on the +X-axis direction side as well as on the +Y-axis direction side (upper side) on the end surface in the −Z-axis direction of the assisting plate 84 to rotatably support the linking portion of the second adjusting driver 87.

Further in the assisting plate 84, as shown in FIG. 8, two positioning projections 846A for positioning the below-described shift cover of the zoom and focus adjuster 9 and two screw holes 846B for fixing are formed at the end in the +Y-axis direction (upper end).

In the assisting plate 84, a screw hole 847 (see FIG. 9) for fixing the supporting plate 85 and rotation shafts 848A and 848B (see FIG. 10) for rotatably supporting the dial gear and the intermediate gear of the first adjusting driver 86 are formed at the end in the +X-axis direction.

As shown in FIG. 5, 6 or 8, a plurality of reinforcing ribs 849 stand on the end surface in the +Z-axis direction of the assisting plate 84. By providing such reinforcing ribs 849, the projection position adjuster 8 is less affected by the external force, thus preventing the projection position from being deviated due to the external force.

In the assisting plate 84, an engaging recess 840 (see FIG. 10) extending along the X-axis direction is formed on the end surface in the −Z-axis direction corresponding to the position of the engaging projection 836 of the second moving plate 83. The engaging recess 840 is formed to have greater length than the sum of the length of the engaging projection 836 in the X-axis direction and the moving amount of the second moving plate 83 in the X-axis direction. While the projection position adjuster 8 is assembled, the engaging projection 836 of the second moving plate 83 is inserted to the engaging recess 840 of the assisting plate 84. The second moving plate 83 is guided by the engaging projection 836 and the engaging recess 840 and is moved in the X-axis direction relative to the assisting plate 84.

As shown in FIG. 8, the supporting plate 85 is disposed on the +X-axis direction side relative to the first moving plate 82, the second moving plate 83 and the assisting plate 84, as a portion to support the first adjusting driver 86 and to reinforce the connecting state between the fixing plate 81 and the assisting plate 84. As shown in FIG. 8, the supporting plate 85 is constituted by a plate having crank-shaped cross-section with a section 851 on the +Y-axis direction side (upper side) denting in the −X-axis direction relative to a section 852 on the −Y-axis direction side (lower side).

As shown in FIG. 8, a shaft supporting portion 853 penetrating through the supporting plate 85 is formed on the +Y-axis direction side (upper side) of the section 851 of the supporting plate 85. The shaft of the dial gear of the first adjusting driver 86 is inserted to the shaft supporting portion 853, so that the dial 861 and the dial gear are rotatably supported.

As shown in FIG. 8, in the supporting plate 85, a stepped portion 854 denting in the −X-axis direction is formed at the corner on the +Z-axis direction side as well as on the +Y-axis direction side (upper side) of the section 851. As shown in FIG. 8, a fixing hole 854A is formed in the stepped portion 854 corresponding to the screw hole 847 (see FIG. 9) of the assisting plate 84. The supporting plate 85 is fixed to the assisting plate 84 by screwing a screw (not shown) to the screw hole 847 (see FIG. 9) of the assisting plate 84 through the fixing hole 854A.

As shown FIG. 8, a fixing hole 855 is formed in the section 851 of the supporting plate 85 at a position corresponding to the rotation shaft 816 of the fixing plate 81.

As shown FIG. 8, a track hole 856 is formed in the section 851 of the supporting plate 85 at a position corresponding to the moving projection 825 of the first moving plate 82. As shown in FIG. 8, the track hole 856 is formed extending in the Y-axis direction so as to avoid that the moving projection 825 mechanically interfere with the supporting plate 85 in accordance with the movement of the first moving plate 82.

As shown FIG. 8, a fixing hole 857 is formed in the section 852 of the supporting plate 85 at a position corresponding to the rotation shaft 817 of the fixing plate 81. The supporting plate 85 is fixed to the fixing plate 81 by screwing screws (not shown) to the rotation shafts 816 and 817 of the fixing plate 81 through the fixing holes 855 and 857.

Figure 9:
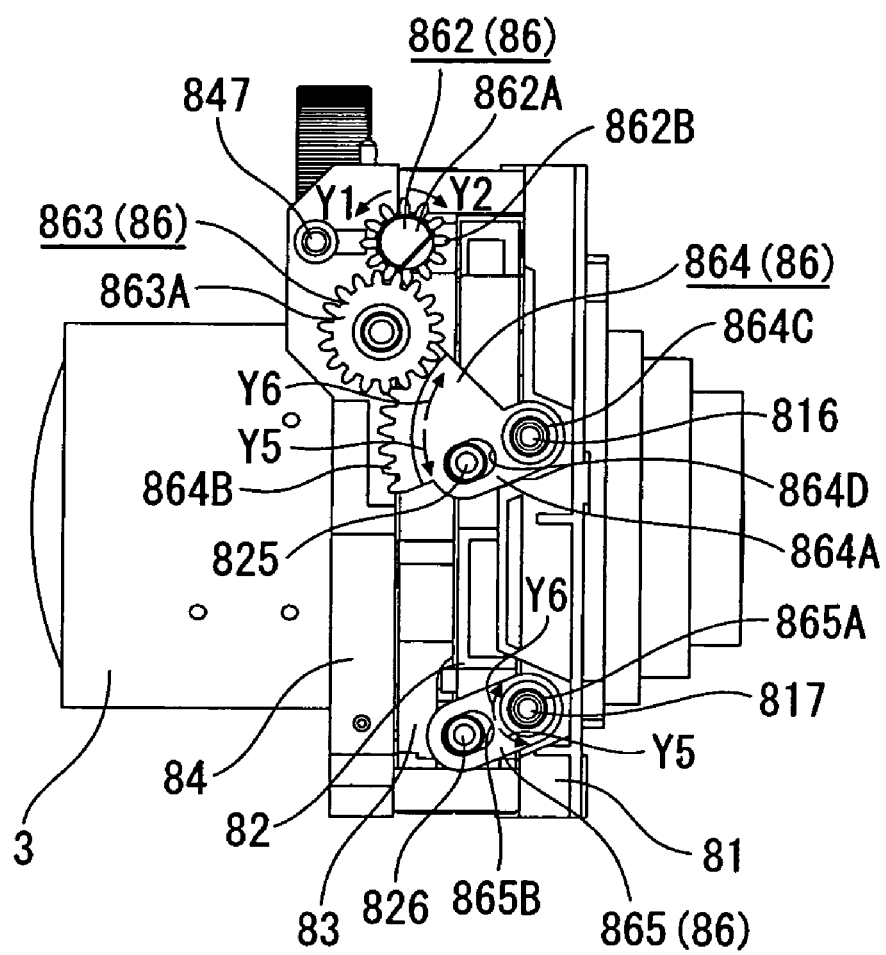
FIG. 9 is an illustration showing the structure of a first adjusting driver of the aforesaid embodiment.

FIG. 9 is an illustration showing the structure of the first adjusting driver 86. Specifically, FIG. 9 is an illustration showing the state where the supporting plate 85 is removed from the device body 8A as seen in the +X-axis direction. Assume that, in FIG. 9, the projection direction from the projection lens 3 defines Z-axis, and two axes orthogonal to the Z-axis respectively define X-axis (horizontal axis) and Y-axis (vertical axis) for simplifying the description in the same manner as FIGS. 5 to 8.

The first adjusting driver 86 is a portion moving the first moving plate 82 in the Y-axis direction by operation of a user and changing the projection position of the projection lens 3 in the Y-axis direction. As shown in FIG. 8 or 9, the first adjusting driver 86 includes a dial 861 (FIG. 8), a dial gear 862, an intermediate gear 863, a driving gear 864 and a linking portion 865.

A part of the dial 861 is exposed from the top surface of the upper case 21 of the exterior case 2, the part being an operating section operated by the user. As shown in FIG. 8, the dial 861 substantially has a columnar shape formed like a cap with a space therein, and is disposed on the +X-axis direction side of the supporting plate 85. As shown in FIG. 8, a hole 861A, which is substantially semicircular with a part in plan view being cut, is formed at the columnar axis position (rotation center) of the dial 861. As shown in FIG. 8, a projection 861B projecting along the peripheral edge of the hole 861A is formed on the back surface of the dial 861 with the space.

The dial gear 862 that engages with the dial 861, rotates with the dial 861 and transmits the rotation to the intermediate gear 863 is disposed on the −X-axis direction side of the supporting plate 85 as shown in FIG. 8. As shown in FIG. 8 or 9, the dial gear 862 consists of a shaft 862A and a gear 862B.

The shaft 862A has a columnar profile, with the tip end thereof substantially having a semicircular cross-section corresponding to the profile of the hole 861A of the dial 861. The shaft 862A is inserted to the shaft supporting portion 853 of the supporting plate 85 and also fits to the hole 861A of the dial 861.

The gear 862B connects to the base end of the shaft 862A, meshes with the below-described first gear of the intermediate gear 863 and transmits the rotation of the dial 861 to the intermediate gear 863. As shown FIG. 8, a circular hole 862B1 is formed at the rotation center of the gear 862B, the circular hole 862B1 being inserted to the rotation shaft 848A of the assisting plate 84 while the projection position adjuster 8 is assembled, so that the dial gear 862 is rotatably supported by the rotation shaft 848A.

As shown in FIG. 8, the intermediate gear 863 integrally consists of a first gear 863A larger in diameter and a second gear 863B smaller in diameter, the intermediate gear 863 being disposed on the −X-axis direction side of the supporting plate 85.

The first gear 863A meshes with the gear 862B of the dial gear 862.

The second gear 863B, which meshes with the below-described meshing portion of the driving gear 864, transmits the rotation of the dial gear 862 to the driving gear 864.

As shown FIG. 8 or 9, a circular hole 863C is formed at the rotation center of the intermediate gear 863, which is inserted to the rotation shaft 848B of the assisting plate 84 while the projection position adjuster 8 is assembled, so that the intermediate gear 863 is rotatably supported by the rotation shaft 848B.

As shown in FIG. 8 or 9, the driving gear 864 has a sector form in plan view and is disposed on the −X-axis direction side of the supporting plate 85. As shown in FIG. 8 or 9, the driving gear 864 consists of a gear body 864A and a meshing portion 864B.

The gear body 864A is a portion rotatably supported by the rotation shaft 816 of the fixing plate 81 with a circular hole 864C formed at the base end thereof, to which the rotation shaft 816 of the fixing plate 81 can be inserted.

A track hole 864D is formed in the gear body 864A, the track hole 864D radially extending from the center of the circular hole 864C. The moving projection 825 of the first moving plate 82 is inserted to this track hole 864D while the projection position adjuster 8 is assembled.

The meshing portion 864B is formed at the arc portion of the tip end of the gear body 864A to mesh with the second gear 863B of the intermediate gear 863.

As shown in FIG. 8 or 9, the linking portion 865, which is a columnar profile with the four corners of the rectangular parallelepiped being chamfered, is disposed on the −X-axis direction side of the supporting plate 85 to assist the movement of the first moving plate 82 in the Y-axis direction (the first axial direction).

A circular hole 865A is formed at one of the end sides of the linking portion 865. The rotation shaft 817 of the fixing plate 81 is inserted to the circular hole 865A while the projection position adjuster 8 is assembled, so that the linking portion 865 is rotatably supported by the rotation shaft 817.

A track hole 865B is formed at the other end side of the linking portion 865, the track hole 865B extending in the direction away from the center of the circular hole 865A. The moving projection 826 of the first moving plate 82 is inserted to the track hole 865B while the projection position adjuster 8 is assembled.

According to the above-described arrangement, when the user rotates the dial 861 in the Y1 direction (FIG. 9), the rotation of the dial 861 is transmitted to the driving gear 864 by the dial gear 862 and the intermediate gear 863, so that the driving gear 864 is rotated around the rotation shaft 816 in Y5 direction (FIG. 9). At this time, the moving projection 825 is guided by the track hole 864D, so that the first moving plate 82 is moved in the −Y-axis direction (downward). Then, the projection lens 3 is moved in the −Y-axis direction (downward) along with the first moving plate 82, and the projection position is adjusted in the −Y-axis direction (downward). Here, the linking portion 865 is interlocked with the movement of the first moving plate 82 by the track hole 865B and the moving projection 826 to rotate around the rotation shaft 817 in the Y5 direction (FIG. 9) in the same manner as the driving gear 864. Because the linking portion 865 is interlocked with the movement of the first moving plate 82, the first moving plate 82 can smoothly be moved in the Y-axis direction.

On the other hand, when the user rotates the dial 861 in Y2 direction (FIG. 9), the driving gear 864 is rotated in Y6 direction (FIG. 9) around the rotation shaft 816 contrary to the above-described manner. At this time, the moving projection 825 is guided by the track hole 864D and the first moving plate 82 is moved in the +Y-axis direction (upward), so that the projection position is moved in the +Y-axis direction (upward).

Figure 10:
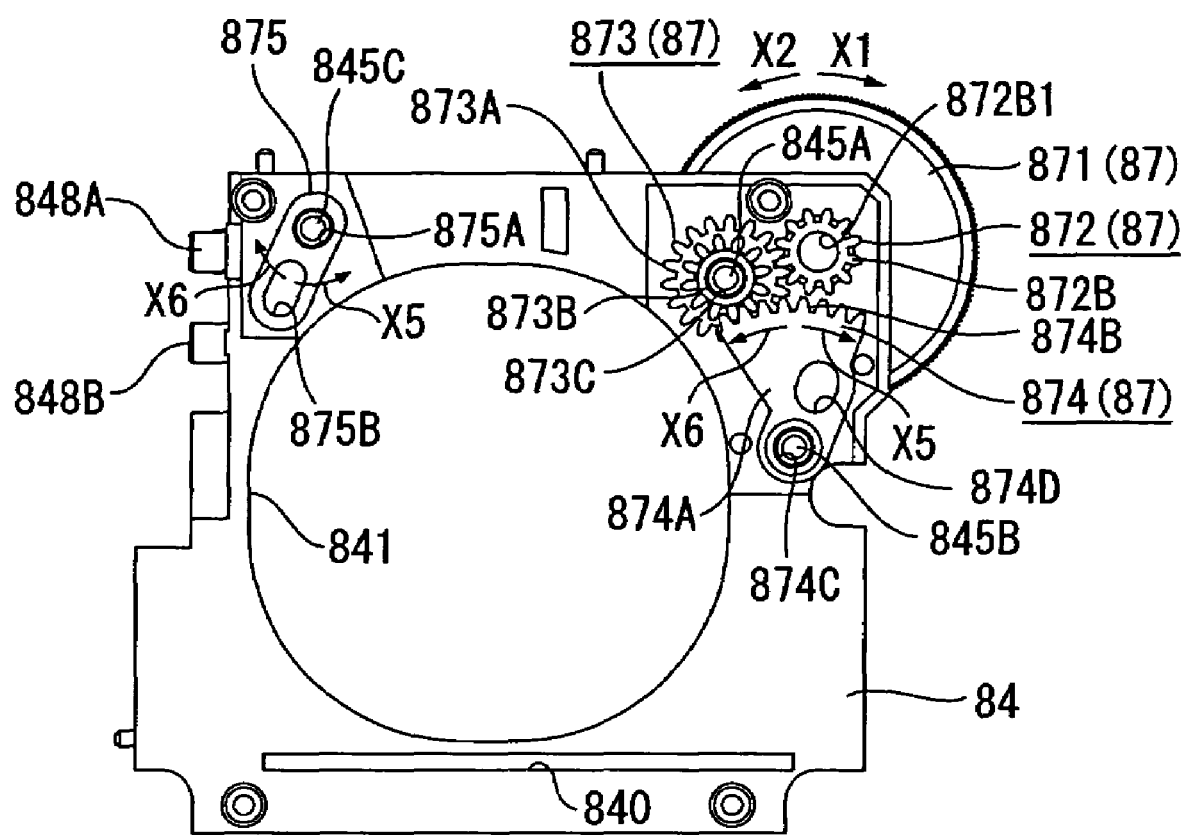
FIG. 10 is an illustration showing the structure of a second adjusting driver of the aforesaid embodiment.
Figure 10:
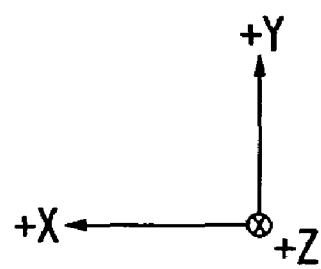

FIG. 10 is an illustration showing the structure of the second adjusting driver 87. Specifically, FIG. 10 is an illustration showing the state where the second adjusting driver 87 is disposed at the assisting plate 84 as seen in the −Z-axis direction. Assume that, in FIG. 10, the projection direction from the projection lens 3 defines Z-axis, and two axes orthogonal to the Z-axis respectively define X-axis (horizontal axis) and Y-axis (vertical axis) for simplifying the description in the same manner as FIGS. 5 to 9.

The second adjusting driver 87 is a portion for changing the projection position of the projection lens 3 in the X-axis direction when the second moving plate 83 is moved in the X-axis direction by the operation of the user and the first moving plate 82 is interlocked with the movement of the second moving plate 83. The second adjusting driver 87 includes a dial 871 (including a hole 871A and an unshown projection), a dial gear 872 (including a shaft 872A, a gear 872B and a circular hole 872B1), an intermediate gear 873 (including a first gear 873A, a second gear 873B and a circular hole 873C), a driving gear 874 (including a gear body 874A, a meshing portion 874B, a circular hole 874C and a track hole 874D) and a linking portion 875 (including a circular hole 875A and a track hole 875B), which are similar to the dial 861 (including the hole 861A and the projection 861B), the dial gear 862 (including the shaft 862A, the gear 862B and the circular hole 862B1), the intermediate gear 863 (including the first gear 863A, the second gear 863B and the circular hole 863C), the driving gear 864 (including the gear body 864A, the meshing portion 864B, the circular hole 864C and the track hole 864D) and the linking portion 865 (including the circular hole 865A and the track hole 865B) of the first adjusting driver 87.

A part of the dial 871 is exposed from the top surface of the upper case 21 of the exterior case 2, defining an operating portion operated by the user. As shown in FIG. 10, the dial 871 is disposed on the +Z-axis direction side of the assisting plate 84 and also disposed at the recess 843 of the assisting plate 84.

As shown in FIG. 10, the dial gear 872 is disposed on the −Z-axis direction side of the assisting plate 84. As shown in FIG. 8, the shaft 872A of the dial gear 872 is inserted to the insertion hole 844A of the assisting plate 84 and fitted to the hole 871A of the dial 871 while the projection position adjuster 8 is assembled.

As shown in FIG. 10, the intermediate gear 873 is disposed on the −Z-axis direction side of the assisting plate 84. As shown in FIG. 10, the rotation shaft 845A of the assisting plate 84 is inserted to the circular hole 873C of the intermediate gear 873 and the intermediate gear 873 is rotatably supported by the rotation shaft 845A while the projection position adjuster 8 is assembled.

As shown in FIG. 10, the driving gear 874 is disposed on the −Z-axis direction side of the assisting plate 84. As shown in FIG. 10, the rotation shaft 845B of the assisting plate 84 is inserted to the circular hole 874C of the driving gear 874 and the driving gear 874 is rotatably supported by the rotation shaft 845B while the projection position adjuster 8 is assembled. The moving projection 834 of the second moving plate 83 is inserted to the track hole 874D of the driving gear 874 while the projection position adjuster 8 is assembled.

As shown in FIG. 10, the linking portion 875 is disposed on the −Z-axis direction side of the assisting plate 84. As shown in FIG. 10, the rotation shaft 845C of the assisting plate 84 is inserted to the circular hole 875A of the linking portion 875 and the linking portion 875 is rotatably supported by the rotation shaft 845C while the projection position adjuster 8 is assembled. The moving projection 835 of the second moving plate 83 is inserted to the track hole 875B of the linking portion 875 while the projection position adjuster 8 is assembled.

According to the above-described arrangement, when the user rotates the dial 871 in X1 direction (FIG. 10), the rotation of the dial 871 is transmitted to the driving gear 874 by the dial gear 872 and the intermediate gear 873, so that the driving gear 874 is rotated around the rotation shaft 845B in X5 direction (FIG. 10). At this time, the moving projection 834 is guided by the track hole 874D, so that the second moving plate 83 is moved in the −X-axis direction. Here, the first moving plate 82 is moved in the −X-axis direction along with the second moving plate 83 by the engaging recess (not shown) of the second moving plate 83 and the engaging projection 824 of the first moving plate 82. Then, the projection lens 3 is moved in the −X-axis direction along with the first moving plate 82, and the projection position is adjusted in the −X-axis direction. Here, the linking portion 875 is interlocked with the movement of the second moving plate 83 by the track hole 875B and the moving projection 835 to rotate around the rotation shaft 845C in the X5 direction (FIG. 10) in the same manner as the driving gear 874. Because the linking portion 875 is interlocked with the movement of the second moving plate 83, the second moving plate 83 can smoothly be moved in the X-axis direction.

On the other hand, when the user rotates the dial 871 in X2 direction (FIG. 10), the driving gear 874 is rotated in X6 direction (FIG. 10) around the rotation shaft 845B contrary to the above-described manner. At this time, the moving projection 834 is guided by the track hole 874D and the second moving plate 83 and the first moving plate 82 are moved in the +X-axis direction, so that the projection position is adjusted in the +X-axis direction.

As shown in FIG. 8, the biasing member 88 consists of four first biasing members 88A disposed between the first moving plate 82 and the second moving plate 83, and a second biasing member 88B disposed between the second moving plate 83 and the below-described shift cover of the zoom and focus adjuster 9.

The four first biasing members 88A each are a cylindrical molding product made of resin material formed by molding process. As shown in FIG. 8, the first biasing members 88A are respectively disposed at the recesses 823 of the first moving plate 82 so that the cylindrical axis direction is aligned with the X-axis direction. While the projection position adjuster 8 is assembled, these first biasing members 88A bias the first moving plate 82 to the fixing plate 81 and also bias the second moving plate 83 to the assisting plate 84.

Owing to this, frictional resistance is generated between the fixing plate 81 and the first moving plate 82, and between the assisting plate 84 and the second moving plate 83 at the same time, so that the projection lens 3 can be held at the predetermined shift position when the dial 861 or the dial 871 is not operated. In particular, the position of the projection lens 3 can be prevented from being changed from the predetermined shift position due to own weight of the projection lens 3.

As shown in FIG. 8, the second biasing member 88B is a cylindrical molding product like the first biasing members 88A. The first biasing member 88B (translator's comment: correctly, the second biasing member 88B) is disposed at the recess 837 of the second moving plate 83 so that the cylindrical axis direction is aligned with the Z-axis direction. The second biasing member 88B biases the second moving plate 83 to the assisting plate 84 in the −Y-axis direction (downward) while the projection position adjuster 8 is assembled. In other words, the engaging projection 836 of the second moving plate 83 is biased in the −Y-axis direction (downward) to the engaging recess 840 of the assisting plate 84.

Figure 11:
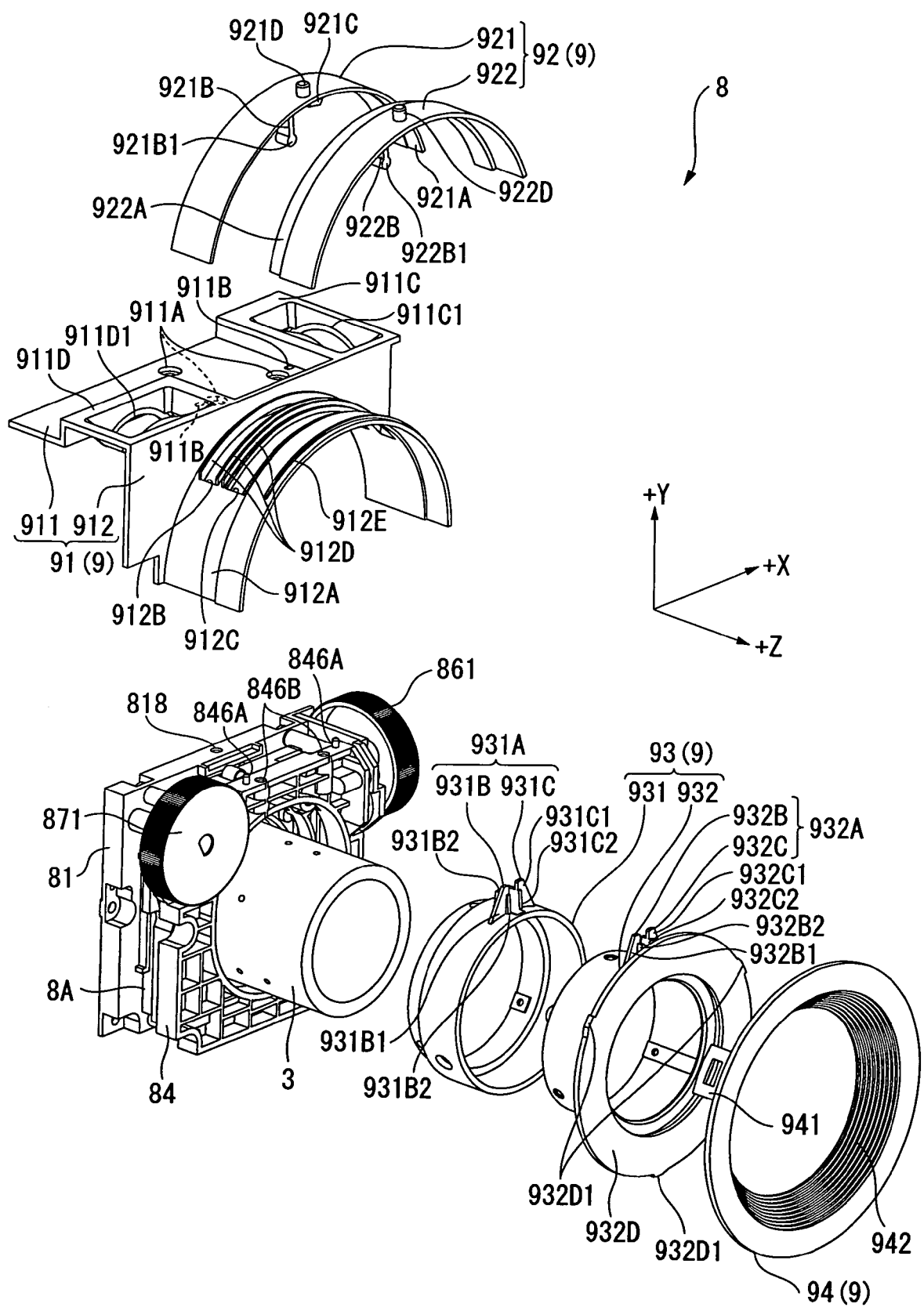
FIG. 11 is an illustration showing the structure of a zoom and focus adjuster of the aforesaid embodiment.

FIG. 11 is an exploded perspective view showing the structure of the zoom and focus adjuster 9.

Figure 12:
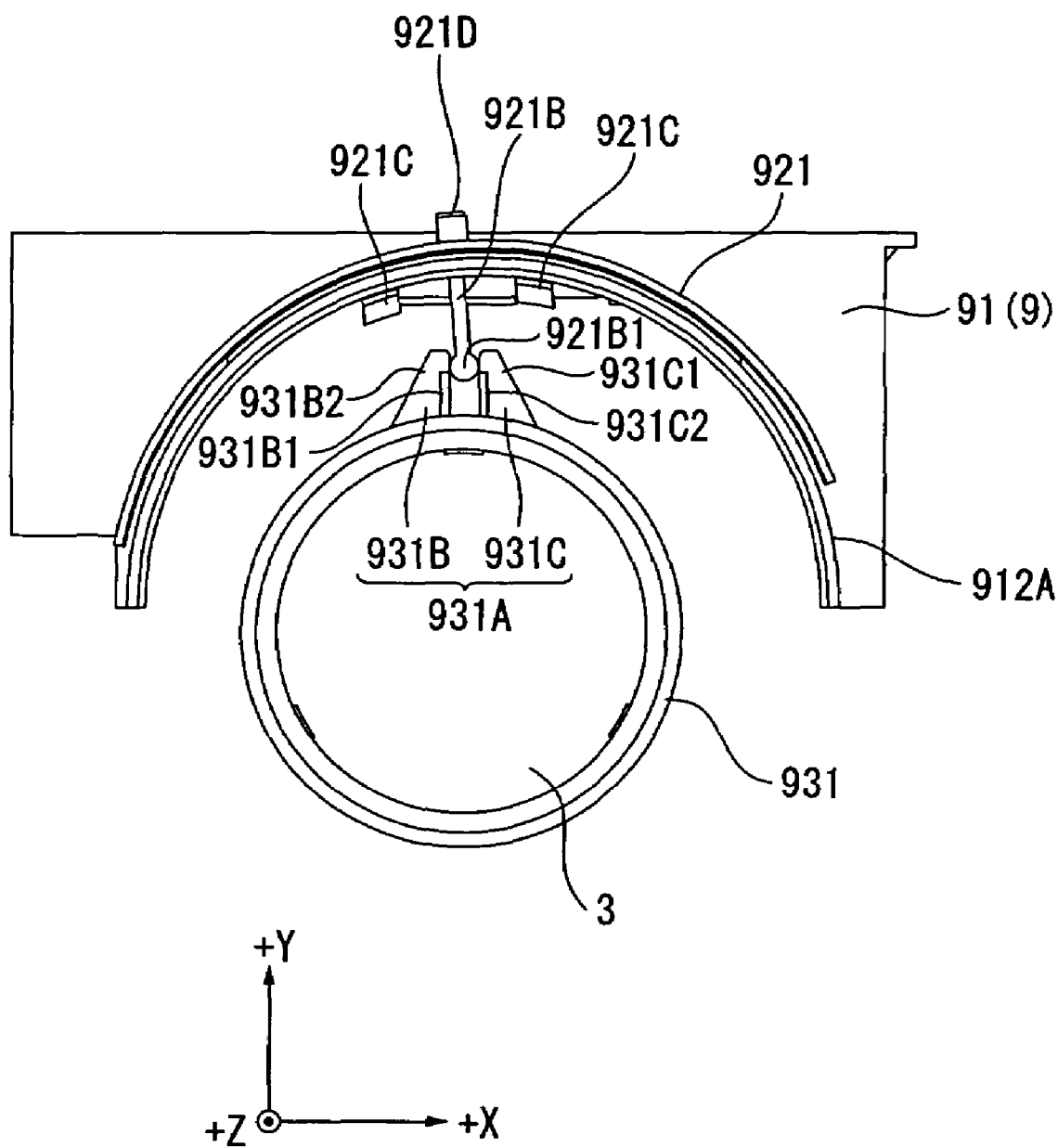
FIG. 12 is an explanatory diagram showing the structure of the zoom and focus adjuster of the aforesaid embodiment.

FIG. 12 is an illustration showing the structure of the zoom and focus adjuster 9. More specifically, FIG. 12 is an illustration showing the engaging structure between a zoom lever and a zoom ring as seen in the +Z-axis direction. Assume that, in FIG. 11 and, the projection direction from the projection lens 3 defines Z-axis, and two axes orthogonal to the Z-axis respectively define X-axis (horizontal axis) and Y-axis (vertical axis) for simplifying the description in the same manner as FIGS. 5 to 10.

The zoom and focus adjuster 9 adjusts the zoom and the focus of the projection lens 3. As shown in FIG. 11, the zoom and focus adjuster 9 includes a shift cover 91 as a base, a pair of levers 92, a pair of rings 93 as a relative position changing section and a ring cover 94.

As shown in FIG. 11, the shift cover 91, which is disposed on the +Y-axis direction side (upper end side) of the device body 8A and also on the +Y-axis direction side (upper side) of the projection lens 3, movably supports the pair of levers 92. As shown in FIG. 11, the shift cover 91 consists of a base 911 and a supporting portion 912.

As shown in FIG. 11, the base 911 is a portion fixed by the fixing plate 81 and the assisting plate 84 of the device body 8A. As shown in FIG. 11, the base 911 is made of a rectangular plate in plan view.

As shown in FIG. 11, three fixing holes 911A are formed in the base 911 at positions corresponding to the screw hole 818 of the fixing plate 81 and the two screw holes 846B of the assisting plate 84. There are also provided two positioning holes 911B at positions corresponding to the two positioning projections 846A of the assisting plate 84. The shift cover 91 is positioned relative to the device body 8A by inserting the two positioning projections 846A of the assisting plate 84 to the two positioning holes 911B, and the shift cover 91 is fixed to the device body 8A by respectively screwing screws (not shown) to the screw holes 818 and 846B of the fixing plate 81 and the assisting plate 84 through the three fixing holes 911A.

As shown in FIG. 11, bulged portions 911C and 911D, which are rectangular in plan view bulged in the +Y-axis direction (upward), are formed corresponding to the dial 861 of the first adjusting driver 86 and the dial 871 of the second adjusting driver 87.

As shown in FIG. 11, the substantial centers of the bulged portions 911C and 911D are dented in the −Y-axis direction (downward), where openings 911C1 and 911D1 are formed at the bottoms of the bulged portions 911C and 911D respectively corresponding to the profiles of the dials 861 and 871. In other words, while the shift cover 91 is fixed to the device body 8A, the dials 861 and 871 are partially exposed through the openings 911C1 and 911D1.

The supporting portion 912 is a portion for supporting the pair of levers 92. As shown in FIG. 11, the supporting portion 912 substantially extends downward perpendicularly from the edge in the +Z-axis direction of the base 911 toward the −Y-axis direction (downward), and a portion 912A substantially having an arc profile extending from the end surface in the +Z-axis direction toward the +Z-axis direction. While the shift cover 91 is fixed to the device body 8A, the supporting portion 912 is disposed to cover the tip end on the +Y-axis direction side (upper side) of the projection lens 3 projected from the device body 8A.

The portion 912A is an arc portion for supporting the pair of levers 92. As shown in FIG. 11, the tip end of the circular portion 912A extends outward relative to the base end with a step.

As shown in FIG. 11, two guiding holes 912B and 912C extending in circumferential direction of the arc are formed substantially at the center in the X-axis direction of the base end of the portion 912A. The pair of levers 92 engage with the two guiding holes 912B and 912C.

Further, three rails 912D are formed near the two guiding holes 912B and 912C, the rails 912D extending along the guiding holes 912B and 912C and projecting outward with the same height. Similarly, a rail 912E is formed at the tip end of the portion 912A with the same height as the three rails 912D. These rails 912D and 912E are portions on which the pair of levers 92 are abutted, so that the frictional force between the pair of levers 92 and the supporting portion 912 can be reduced, thus smoothly operating the pair of levers 92 as compared to the arrangement without the rails 912D and 912E.

The pair of levers 92 are partially exposed from the top surface of the upper case 21 of the exterior case 2, defining an operating section operated by the user. As shown in FIG. 11, the pair of levers 92 include a zoom lever 921 for adjusting the zoom of the projection image and a focus lever 922 for adjusting the focus of the projection image.

As shown in FIG. 11, the zoom lever 921 corresponds to the profile of the portion 912A of the supporting portion 912 of the shift cover 91, and substantially has an arc profile as seen in the Z-axis direction.

As shown in FIG. 11, a step 921A is formed at the inner arc surface of the zoom lever 921 so that the thickness becomes smaller toward the +Z-axis direction side.

As shown in FIG. 11, an engaging portion 921B projecting in the −Y-axis direction (downward) is formed substantially at the center in the X-axis direction of the inner arc surface of the zoom lever 921.

The engaging portion 921B has the same width in the Z-axis direction as that of the guiding hole 912B in the Z-axis direction of the shift cover 91, so that the engaging portion 921B is inserted and engaged to the guiding hole 912B while the zoom lever 921 is set at the shift cover 91. That is, the zoom lever 921 can move in the circumferential direction of the arc when being guided by the engaging portion 921B and the guiding hole 912B.

Further, a ring engaging portion 921B1 is formed at the tip end of the engaging portion 921B, the ring engaging portion 921B1 having larger diameter than the base end of the engaging portion 921B and a cross section in an X-Y plane thereof substantially being spherical. The ring engaging portion 921B1 is a portion engaging with the below-described zoom ring of the pair of rings 93.

Furthermore, engaging assistant portions 921C (FIGS. 11 and 12) projecting in the −Y-axis direction (downward) are respectively formed at the both sides in the circumferential direction of the inner arc surface of the zoom lever 921. The engaging assistant portion 921C has the same width in the Z-axis direction as that of the guiding hole 912B in the Z-axis direction of the shift cover 91, so that the engaging assistant portion 921C is inserted and engaged to the guiding hole 912B while the zoom lever 921 is set at the shift cover 91. By providing the engaging assistant portion 921C, the zoom lever 921 can more smoothly be moved in the circumferential direction of the arc.

As shown in FIG. 11, a projection 921D projecting outward is formed substantially at the center in the X-axis direction of the outer arc surface of the zoom lever 921. The user can move the zoom lever 921 in the circumferential direction of the arc by gripping the projection 921D.

As shown in FIG. 11, the focus lever 922 substantially has the same profile as the zoom lever 921. Specifically, the focus lever 922 includes an engaging portion 922B (including a ring engaging portion 922B1), an unshown engaging assistant portion and a projection 922D, which are similar to the engaging portion 921B (including the ring engaging portion 921B1), the engaging assistant portion 921C and the projection 921D of the zoom lever 921.

As shown in FIG. 11, the focus lever 922 has a step 922A with the portion on the −Z-axis direction side being dented inside as compared to the portion on the +Z-axis direction side. While the focus lever 922 is set at the shift cover 91, not only the step 921A of the zoom lever 921 is disposed to abut on the step 922A, but also the zoom lever 921 and the focus lever 922 abut on the rails 912D and 912E of the shift cover 91, so that the outer arc surface of the zoom lever 921 and that of the focus lever 922 are on the same plane. The focus lever 922 can move in the circumferential direction of the arc, because the engaging portion 922B and the engaging assistant portion are inserted and engaged to the guiding hole 912C of the shift cover 91 and are guided by the engaging portion 922B, the engaging assistant portion and the guiding hole 912C.

The pair of rings 93 are attached to the lens barrel 31 of the projection lens 3, so that the relative positions of the plurality of lenses inside the lens barrel 31 are changed according to the movement of the pair of levers 92, thereby adjusting the zoom and the focus of the projection image. The pair of rings 93 include a zoom ring 931 for adjusting the zoom of the projection image and a focus ring 932 for adjusting the focus of the projection image.

As shown in FIG. 11, the zoom ring 931 substantially having a cylindrical profile with larger diameter than that of the lens barrel 31 of the projection lens 3 is attached to a component (not shown) out of the lens barrel 31 consists of the plurality of components, the component changing the relative positions of the plurality of lenses by rotating and adjusts the zoom of the projection image in order to rotate the component.

As shown in FIG. 11 or 12, an engaging projection 931A is formed on the outer cylindrical surface of the zoom ring 931, the engaging projection 931A projecting outward for engaging with the ring engaging portion 921B1 of the engaging portion 921B of the zoom lever 921.

As shown in FIG. 11 or 12, the engaging projection 931A includes a pair of projections 931B and 931C disposed with a space having the same dimension as the width in the X-axis direction of the ring engaging portion 921B1.

As shown in FIG. 11 or 12, the pair of projections 931B and 931C substantially having right triangles as seen in the Z-axis direction include plates 931B1 and 931C1 disposed such that the hypotenuses of the right triangles being away from each other, and standing pieces 931B2 and 931C2 extending along a Y-Z plane from the edges facing to each other of the plates 931B1 and 931C1.

As shown in FIG. 12, the ring engaging portion 921B1 of the engaging portion 921B of the zoom lever 921 is disposed between the pair of projections 931B and 931C of the engaging projection 931A while the projection position adjuster 8 is assembled. When the zoom lever 921 is operated by the user and thus the zoom lever 921 is moved in the circumferential direction of the arc, one of the pair of projections 931B and 931C is pressed by the ring engaging portion 921B1, so that the zoom ring 931 is rotated around the cylindrical axis. In response to the rotation of the zoom ring 931, one component of the lens barrel 31 with the zoom ring 931 being attached is rotated, so that the relative positions of the plurality of lenses in the lens barrel 31 are changed, and the focus of the projection image is adjusted.

When the projection lens 3 is moved in the Y-axis direction and the X-axis direction by the device body 8A, the ring engaging portion 921B1 is slid between the pair of projections 931B and 931C, so that the engaging state between the zoom lever 921 and the zoom ring 931 is changed. In other words, even if the projection lens 3 is moved in the Y-axis direction and the X-axis direction, when the zoom lever 921 is operated by the user, the one of the pair of projections 931B and 931C is pressed by the ring engaging portion 921B1, so that the zoom of the projection image is adjusted.

As shown in FIG. 11, the focus ring 932 having the same profile as the zoom ring 931 is attached to a component (not shown) out of the lens barrel 31 consists of the plurality of components, the component changing the relative positions of the plurality of lenses by rotating to adjust the focus of the projection image, in order to rotate the component. As shown in FIG. 11, the focus ring 932 includes an engaging projection 932A (including a pair of projections 932B and 932C, plates 932B1 and 932C1 and standing pieces 932B2 and 932C2), which are similar to the engaging projection 931A (including the pair of projections 931B and 931C, the plates 931B1 and 931C1 and the standing pieces 931B2 and 931C2) of the zoom ring 931.

The ring engaging portion 922B1 of the engaging portion 922B of the focus lever 922 is disposed between the pair of projections 932B and 932C of the engaging projection 932A of the focus ring 932 while the projection position adjuster 8 is assembled in the same manner as the zoom ring 931 and the zoom lever 921. When the focus lever 922 is operated by the user and the focus lever 922 is moved in the circumferential direction of the arc, one of the pair of projections 932B and 932C is pressed by the ring engaging portion 922B1, the one component of the lens barrel 31 with the focus ring 932 being attached is rotated, the relative positions of the plurality of lenses inside the lens barrel 31 are changed, and then the focus of the projection image is adjusted.

When the projection lens 3 is moved in the Y-axis direction and the X-axis direction by the device body 8A, the ring engaging portion 922B1 is slid between the pair of projections 932B and 932C in the same manner as the zoom ring 931 and the zoom lever 921, so that the engaging state between the focus lever 922 and the focus ring 932 is changed. In other words, even if the projection lens 3 is moved in the Y-axis direction and the X-axis direction, when the focus lever 922 is operated by the user, the one of the pair of projections 932B and 932C is pressed by the ring engaging portion 922B1, so that the focus of the projection image is adjusted.

That is, the above-described ring engaging portions 921B1 and 922B1, and the engaging projections 931A and 932A correspond to the engaging structure of the invention.

As shown in FIG. 11, an extending portion 932D extending outward is formed at the edge in the +Z-axis direction of the focus ring 932. As shown in FIG. 11, three hook engaging portions 932D1 are formed at the edge of the extending portion 932D with predetermined intervals.

The ring cover 94 is attached to the focus ring 932 for covering the peripheral edge of the tip end of the lens barrel 31 of the projection lens 3. As shown in FIG. 11, the ring cover 94 is formed in a circular frame in plan view.

As shown in FIG. 11, three hooks 941 are formed at the outer peripheral edge of the ring cover 94 corresponding to the three hook engaging portions 932D1 of the focus ring 932. By engaging the respective hooks 941 to the hook engaging portions 932D1, the ring cover 94 is attached to the focus ring 932.

As shown in FIG. 11, an extending portion 942 with the opening diameter gradually being smaller toward the −Z-axis direction is formed at the inner peripheral edge of the ring cover 94. The tip end of the extending portion 942 is abutted on the end surface in the +Z-axis direction of the extending portion 932D of the focus ring 932 while the ring cover 94 is attached to the focus ring 932. By providing the ring cover 94 in this way, the gap between the opening 215 of the exterior case 2 and the projection lens 3 is closed, so that it can be avoided that the light leaks from the gap and that dusts or the like invade the projector 1.

In the above-described embodiment, the projection lens 3 is supported and fixed by the first moving plate 82. The first moving plate 82 is moved in the Y-axis direction when the dial 861 is rotated by the user and the first adjusting driver 86 is driven. Accordingly, the projection lens 3 is moved in the Y-axis direction and the projection position can be adjusted in the Y-axis direction. The second moving plate 83 is moved in the X-axis direction when the dial 871 is rotated by the user and the second adjusting driver 87 is driven. At this time, the first moving plate 82 is moved in the −X-axis direction along with the second moving plate 83 when the second moving plate 83 is engaged with the first moving plate 82 by the engaging projection 824 and the engaging recess (not shown). Accordingly, the projection lens 3 is moved in the X-axis direction and the projection position can be adjusted in the X-axis direction.

Therefore, the projection position of the projection lens 3 can be adjusted in the two axes directions orthogonal to each other, in a plane orthogonal to the projection direction, thus enhancing convenience of the projector 1.

Since the first moving plate 82 for supporting and fixing the projection lens 3 is movably abutted on the fixing plate 81, the first moving plate 82 moves along the fixing plate 81. Therefore, the first moving plate 82 will not vibrate when the first moving plate 82 for supporting and fixing the projection lens 3 is moved, namely, the projection position will not wave when adjusting the projection position, thus adjusting the projection position highly accurately.

Here, there is no need to form a structure that can insert the flange 32 of the projection lens 3 to the second moving plate 83 so that the first moving plate 82 supports and fixes the projection lens 3 by the end surface facing the fixing plate 81. Accordingly, the structure of the second moving plate 83 can be simplified. Further, the second moving plate 83 is not required to be formed large considering the strength of the second moving plate 83, thus the second moving plate 83 being downsized and consequently the projection position adjuster 8 being downsized.

Since the first biasing members 88A are interposed between the first moving plate 82 and the second moving plate 83, the second moving plate 83 can be biased to the first moving plate 82 and the assisting plate 84. Therefore, the first biasing members 88A can fill the gap generated due to manufacturing tolerance or the like between the second moving plate 83 and the first moving plate 82 as well as the assisting plate 84, the second moving plate 83 will not vibrate when the second moving plate 83 is moved in the X-axis direction, thus smoothly moving the second moving plate 83. Since the first biasing members 88A are interposed in the above-described manner, the first moving plate 82 is also biased to the fixing plate 81, and consequently, the first moving plate 82 can preferably be moved relative to the fixing plate 81. Accordingly, the projection position will not wave when moving the respective moving plates 82 and 83 and adjusting the projection position, thus further highly accurately adjusting the projection position.

Further, since the second biasing member 88B is interposed between the shift cover 91 and the second moving plate 83, the second moving plate 83 can be biased to the assisting plate 84 in the −Y-axis direction (downward). Therefore, the second biasing member 88B can fill the gap generated due to manufacturing tolerance or the like between the second moving plate 83 and the assisting plate 84, the second moving plate 83 will not vibrate when the second moving plate 83 is moved in the X-axis direction, thus smoothly moving the second moving plate 83. Accordingly, the projection position will not wave when moving the second moving plate 83 in the X-axis direction and adjusting the projection position in the X-axis direction, thus further highly accurately adjusting the projection position.

Here, since the first biasing members 88A and the second biasing member 88B are cylindrical molding products made of resin material formed by molding process, not only the biasing member 88 can easily be manufactured and reduced in manufacturing, but also the projection position adjuster 8 and the projector 1 can be reduced in size.

Since the recesses 823 and 837 are formed between the first moving plate 82 and the second moving plate 83, the first biasing members 88A and the second biasing member 88B can be located at the recesses 823 and 837, so that the biasing member 88 can be moved along with the movement of the first moving plate 82 and the second moving plate 83. Therefore, the biasing state by the biasing member 88 can preferably be maintained and the projection position will not vibrate when adjusting the projection position, thus adjusting the projection position further highly accurately.

Since the first biasing members 88A are disposed at the recesses 823 such that the cylindrical axis is orthogonal to the moving direction (Y-axis direction) of the first moving plate 82 while the second biasing member 88B is disposed at the recess 837 such that the cylindrical axis is orthogonal to the moving direction (X-axis direction) of the second moving plate 83, the cylindrical ends in the axial direction of the biasing member 88 will not mechanically interfere with the second moving plate 83 and the shift cover 91 when moving the respective moving plates 82 and 83, thus smoothly moving the respective moving plates 82 and 83.

Since the projection position adjuster 8 includes the zoom and focus adjuster 9 equipped with the shift cover 91, the pair of levers 92 and the pair of rings 93, not only the projection position, but also the zoom and the focus can be adjusted by changing the relative positions of the plurality of lenses of the projection lens 3.

Since the pair of levers 92 and the pair of rings 93 are engaged by the ring engaging portions 921B1 and 922B1 as well as the engaging projections 931A and 932A, the engaging state can be changed according to the movement of the projection lens 3 in the Y-axis direction and the X-axis direction. Therefore, even when the projection lens 3 is moved in the Y-axis direction and the X-axis direction, the focus and the zoom of the projection image can be adjusted.

Since the engaging structure between the ring engaging portions 921B1, 922B1 and the engaging projections 931A, 932A are employed, the engaging structure between the pair of levers 92 and the pair of rings 93 can be simplified, thus reducing the manufacturing cost of the zoom and focus adjuster 9.

The preferable embodiment of the invention has been described above, however, the scope of the invention is not restricted to the above-described embodiment, but includes modifications and improvements as long as an object of the invention can be achieved.

In the above-described embodiment, although the first moving plate 82 is moved in the Y-axis direction by driving the first adjusting driver 86 and the second moving plate 83 is moved in the X-axis direction by driving the second adjusting driver 87, it is not limited thereto. For example, the first moving plate may be moved in the X-axis direction by driving the first adjusting driver, and the second moving plate may be moved in the Y-axis direction by driving the second adjusting driver.

In the above-described embodiment, although the first adjusting driver 86 includes the dial 861, the dial gear 862, the intermediate gear 863, the driving gear 864 and the linking portion 865, other structure can be employed as long as the first moving plate 82 can move in the first axial direction. The second adjusting driver 87 can also employ other structure as long as the second moving plate 83 can move in the second axial direction.

In the above-described embodiment, although the first moving plate 82 and the second moving plate 83 are superposed in the projection direction (+Z-axis direction) relative to the fixing plate 81, these may be superposed in the direction opposite to the projection direction (−Z-axis direction) relative to the fixing plate 81. Even in this case, the projection lens 3 is preferably supported and fixed by the end surface of the first moving plate facing the fixing plate.

In the above-described embodiment, although the first biasing members 88A are interposed between the first moving plate 82 and the second moving plate 83, these may be interposed between the second moving plate 83 and the assisting plate 84.

In the above-described embodiment, although the biasing member 88 is a molding product made of resin material formed by molding process, other material such as metal may be used.

In the above-described embodiment, although the projection position adjuster 8 includes the device body 8A and the zoom and focus adjuster 9, the zoom and focus adjuster 9 may be omitted.

In the above-described embodiment, although the pair of levers 92 and the pair of rings 93 are engaged by the ring engaging portions 921B1 and 922B1 and the engaging projections 931A and 932A as the engaging structure, other structure can be employed as long as the engaging state can be changed according to the movement of the projection lens 3 in the Y-axis direction and the X-axis direction.

In the above-described embodiment, although the optical unit 4 substantially has an L-shape in plan view, it may substantially have a U-shape in plan view for instance.

In the above-described embodiment, although the projector 1 just uses the three liquid crystal panels, the invention may be applied to a projector using one, two or more than three liquid crystal panels.

In the above-described embodiment, although a transmissive liquid crystal panel having different light-incident side and light-irradiation side is used, a reflective liquid crystal panel having common light-incident side and light-irradiation side may be used.

In the above-described embodiment, the liquid crystal panel is used as the optical modulator, an optical modulator using a micro mirror or the like other than a liquid crystal panel may be used. In such case, the polarization plates on the light-incident side and the light-irradiation side can be omitted.

In the above embodiment, although a front-type projector that projects an image in a direction for observing a screen is taken as an example, the invention may be applied to a rear-type projector that projects an image in a direction opposite to the direction for observing the screen.

Although the best configuration for implementing the invention is disclosed above, the invention is not restricted thereto. That is, the invention is mainly illustrated and described on the specific embodiment, however, a person skilled in the art can modify the specific configuration such as shape, material, quantity on the above-described embodiment as long as a technical idea and an object of the invention can be achieved.

Therefore, the description that limits the shape and the material is only the example to make the invention easily understood, but does not intend to limit the invention, so that the invention includes the description using a name of component without a part of or all of the limitation on the shape and the material etc.

The priority application Number JP2004-321210 upon which this patent application is based is hereby incorporated by reference.

What is claimed is:

1. A projector, comprising:
    an optical modulator that forms an optical image by modulating a light beam irradiated by a light source in accordance with image information;
    a projection optical device that projects the optical image formed by the optical modulator in an enlarged manner; and
    a projection position adjuster that moves the projection optical device in a plane orthogonal to a projection direction and adjusts a projection position of the projection optical device,
    the projection position adjuster including:
    a fixing plate fixed inside the projector;
    a first moving plate that can move in a first axial direction and a second axial direction orthogonal to each other in a plane orthogonal to the projection direction;
    a first adjusting driver that moves the first moving plate in the first axial direction;
    a second moving plate that can move in the second axial direction and moves the first moving plate in the second axial direction by engaging with the first moving plate; and
    a second adjusting driver that moves the second moving plate in the second axial direction, wherein
    the first moving plate and the second moving plate are superposed onto the fixing plate in the projection direction or in a direction opposite to the projection direction, and
    the first moving plate is movably abutted on the fixing plate to support and fix the projection optical device.

2. The projector according to claim 1, wherein the first moving plate supports and fixes the projection optical device by an end surface facing the fixing plate.

3. The projector according to claim 1, the projection position adjuster including:
    an assisting plate abutted on the fixing plate and disposed so that the first moving plate and the second moving plate can be sandwiched between the fixing plate and the assisting plate; and
    a biasing member interposed between the first moving plate and the second moving plate, and/or between the second moving plate and the assisting plate, the biasing member biasing the second moving plate relative to at lease one of the first moving plate and the assisting plate.

4. The projector according to claim 3, wherein
    the second moving plate is engaged with the assisting plate in a manner movable in the second axial direction, and
    the projection position adjuster including:
    a base disposed at the second moving plate in the first axial direction for restricting the movement of the second moving plate in the first axial direction; and
    a biasing member interposed between the base and the second moving plate for biasing the second moving plate in the first axial direction relative to the assisting plate.

5. The projector according to claim 3, wherein
    the biasing member has a cylindrical profile, and
    a recess where the biasing member can be disposed is formed on at least one of an end surface of the first moving plate facing the second moving plate and an end surface of the second moving plate on the first axial direction side.

6. The projector according to claim 5, wherein the biasing member is disposed at the recess so that a cylindrical axis of the biasing member is orthogonal to a moving direction of the moving plate where the biasing member is disposed out of the first moving plate and the second moving plate.

7. The projector according to claim 1,
    the projection optical device including:
    a plurality of lenses; and
    a lens barrel where the plurality of lenses are housed so that relative positions of the plurality of lenses can be changed,
    the projection position adjuster including:
    a base attached to the fixing plate;
    a lever movably attached to the base; and
    a relative position changing section attached to the lens barrel of the projection optical device for changing the relative positions of the plurality of lenses of the lens barrel according to movement of the lever, wherein
    the lever and the relative position changing section are engaged to each other and have an engaging structure that can change an engaging state according to movement of the projection optical device in the first axial direction and the second axial direction.

* * * * *